(12) United States Patent
Fedorovskaya et al.

(10) Patent No.: US 9,058,533 B2
(45) Date of Patent: *Jun. 16, 2015

(54) METHOD FOR ENCODING INFORMATION IN ILLUMINATION PATTERNS

(71) Applicant: Eastman Kodak Company, Rochester, NY (US)

(72) Inventors: Elena A. Fedorovskaya, Pittsford, NY (US); Paul James Kane, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,029

(22) Filed: Aug. 21, 2014

(65) Prior Publication Data

US 2014/0361072 A1 Dec. 11, 2014

Related U.S. Application Data

(62) Division of application No. 13/331,048, filed on Dec. 20, 2011, now Pat. No. 8,844,802.

(51) Int. Cl.
*G06K 19/00* (2006.01)
*G06K 7/10* (2006.01)
*G06K 9/20* (2006.01)
*G06K 5/00* (2006.01)
(Continued)

(52) U.S. Cl.
CPC .......... *G06K 7/10732* (2013.01); *G06K 9/2036* (2013.01); *G06K 5/00* (2013.01); *G06K 7/1408* (2013.01); *G06K 19/06159* (2013.01)

(58) Field of Classification Search
USPC ................... 235/435, 439, 454, 462
See application file for complete search history.

(56) References Cited

U.S. PATENT DOCUMENTS

| 6,473,165 | B1 | 10/2002 | Coombs |
| 8,844,802 | B2 * | 9/2014 | Fedorovskaya et al. ...... 235/375 |
| 2002/0190129 | A1 | 12/2002 | Urano et al. |

(Continued)

FOREIGN PATENT DOCUMENTS

WO    WO 02/50790    6/2002

OTHER PUBLICATIONS

Cox et al.; Digital Watermarking and Steganography, 2008.
Esteve-Taboada et al.; Three-dimensional object recognition by Fourier transform profilometry; Applied Optics, vol. 38, No. 22, Aug. 1, 1999, pp. 4760-4765.

(Continued)

*Primary Examiner* — Matthew Mikels
(74) *Attorney, Agent, or Firm* — Nelson Adrian Blish

(57) ABSTRACT

A method for retrieving information encoded in a structured illumination pattern including selecting an encoded structured illumination pattern having a variable intensity; providing an object with a surface having a 3D relief pattern; selecting at least one portion but not all of the object's surface including the 3D surface relief pattern; projecting the selected structured illumination pattern onto the selected portion of the surface; using a digital camera to capture an image of the reflected structured light pattern from the selected portion of the surface; storing the image in a memory; and processing the image of the detected reflected structured light pattern using a processor responsive to the detected reflected structured light pattern and the selected structured light pattern to retrieve the encoded information, wherein the encoded information is based on the geometrical and material properties of the 3D surface relief pattern and is distinct from the object, surface, or relief pattern.

27 Claims, 15 Drawing Sheets

(51) Int. Cl.
*G06K 7/14* (2006.01)
*G06K 19/06* (2006.01)

(56) References Cited

U.S. PATENT DOCUMENTS

2003/0062416 A1 4/2003 Smith et al.
2003/0231788 A1 12/2003 Yukhin et al.
2007/0108288 A1 5/2007 Caskey et al.
2007/0119949 A1 5/2007 Hattersley et al.

OTHER PUBLICATIONS

Bothe et al.; Compact 3D-Camera; Proceedings of SPIE, vol. 4778 (2002), pp. 48-59.
Harthong et al.; Inverse Moire; SPIE vol. 3098, pp. 2-9, 1997.
Salvi et al.; A state of the art in structured light patterns for surface profilometry; Pattern Recognition 43 (2010), pp. 2666-2680.
Li et al.; Object adapted pattern projection—Part I: generation of inverse patterns; Optics and Lasers in Engineering 41 (2004), pp. 31-50.

\* cited by examiner

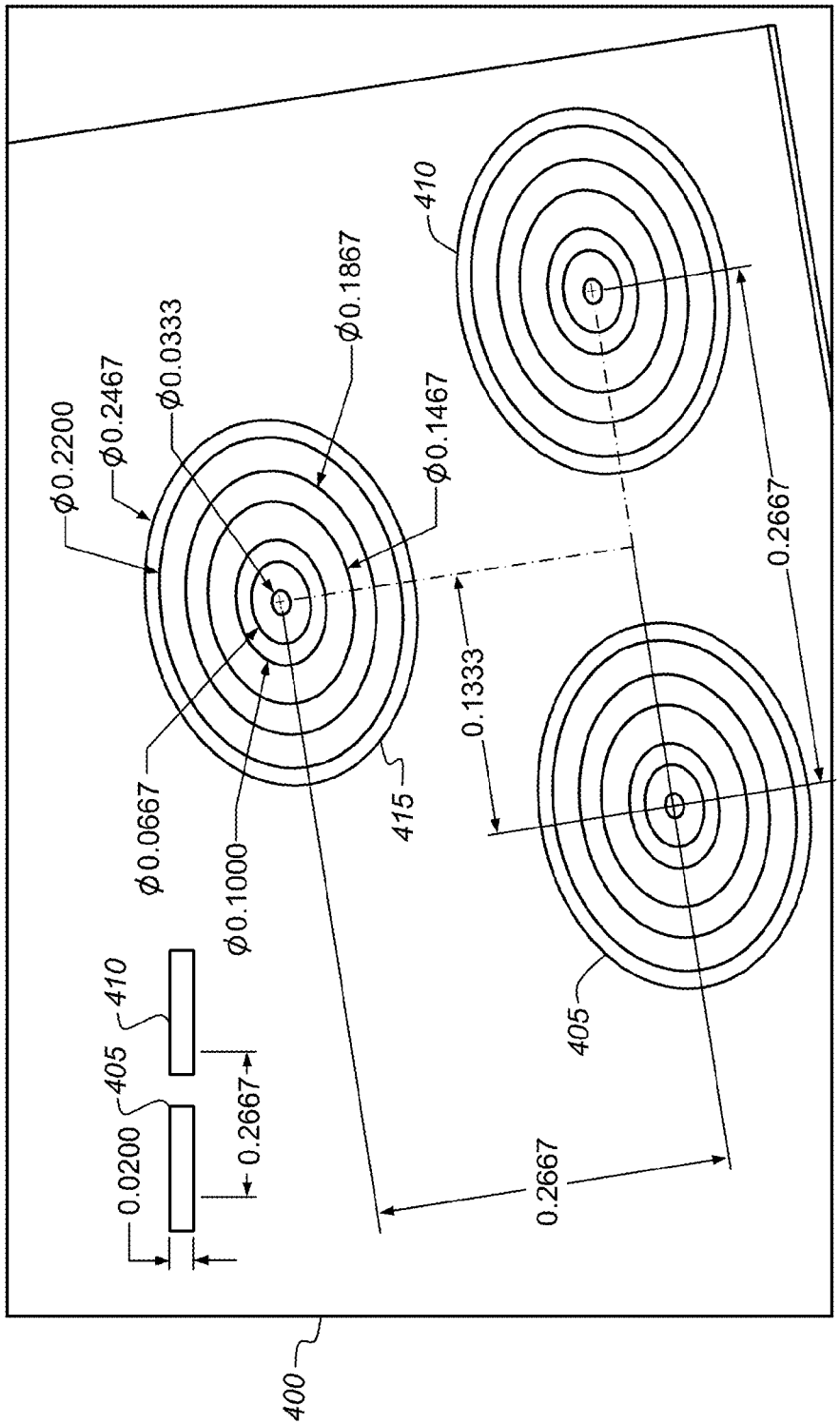

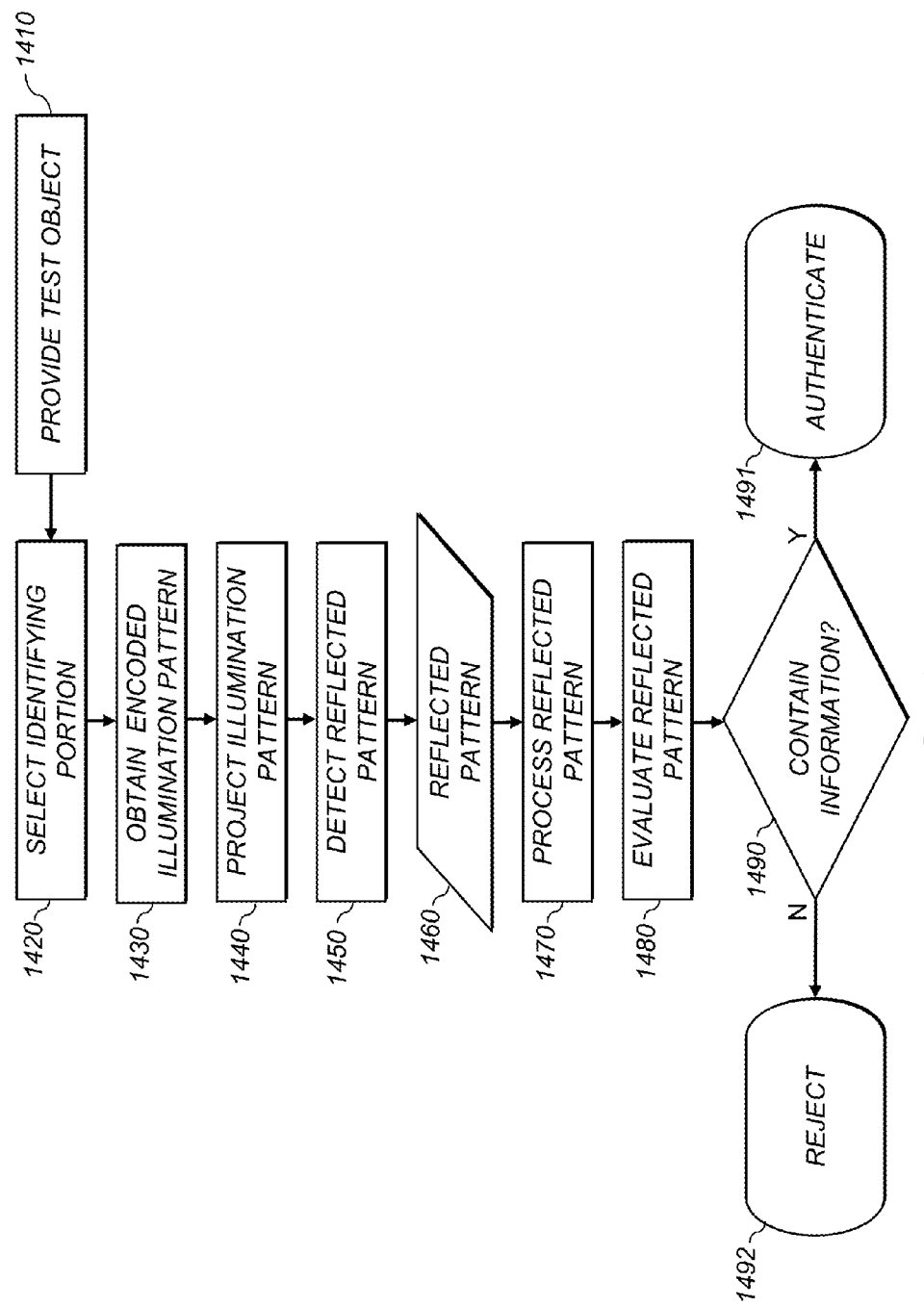

METHOD FOR ENCODING INFORMATION IN ILLUMINATION PATTERNS

CROSS REFERENCE TO RELATED APPLICATIONS

This application is a Divisional of prior U.S. patent application Ser. No. 13/331,048, filed Dec. 20, 2011 (now U.S. Publication No. 2013/0153651) which is hereby incorporated herein by reference in its entirety.

FIELD OF THE INVENTION

The invention relates in general to encoding information and in particular to using the three-dimensional surface characteristics for encoding information in structured light pattern.

BACKGROUND OF THE INVENTION

Automatic recognition and identification of objects, and embedding of information in objects for this purpose, are well-known problems in electronic imaging. Applications include industrial inspection and quality control, shipping and transportation, security and counterfeit detection. In particular, the latter category, also referred to as object authentication, is important to any industry dealing with valuable or precision-made objects.

Common methods of embedding information that can be used to confirm the authenticity of an object are signing, tagging or otherwise marking objects of interest. For automatic purposes, a simple 1D or 2D (such as Quick Response or QR) barcode may be attached, stamped or engraved on objects of interest. In another example, radio frequency identification (RFID) tags may be attached or embedded in the objects. In both cases, the added tags are encoded with identifying information that is transmitted to the recipients by some other means, and can be simply decoded by well-known techniques to verify the identity of the sender. This is an important distinction, in that the above mentioned techniques do not, strictly speaking, verify the authenticity of the object. The tags could in principle be placed onto unauthentic objects, or be faked by other persons familiar with barcode or RFID technology, especially because the presence of such tags is easily detectable. Also, most tagging techniques require at least temporary modification of the object, with tags that could be perceived as extraneous, altering object appearance and aesthetics, which may be undesirable due to the size or value of the object.

In objects such as printed documents, banknotes, checks, etc. watermarking techniques can be used for embedding authenticating information. In this case a special paper with the watermarks is required, which makes it more expensive. Because the watermarks themselves are visible, they can be a target for counterfeiting attempts. Additional disadvantages of this approach are the facts that watermarks contain a very limited amount of information and cannot be changed quickly.

Digital watermarking and steganography overcome the visibility of embedded information, and rigidity issues such that the embedded information can be decoded from the electronic file itself or after scanning the document using a computer program. However there are several limitations of digital watermarking and steganography. The methods can only be used for digital images and digital data, so the extraction of the information occurs via scanning printed documents or analysis of electronic files and cannot be used on other physical objects. The amount of information in these methods is typically limited to 32- or 64 bits. Extracting information in these methods require sophisticated computational algorithms running on fast computers. If the digital images or documents were resized or otherwise edited before printing, embedded information can be distorted and consequently inaccessible. Digital watermarking and steganography methods are discussed in the literature and in textbooks, for example in *Digital Watermarking and Steganography* by Cox, Miller, Bloom, Fridrich and Kalker, Morgan Kaufman, MA, 2008.

Other methods of identification and authentication rely on precise optical characterization of the object. Many non-contact, non-destructive methods have been suggested for optical scanning and recognition of three-dimensional (3D) objects. In particular, methods relating to the present invention employ patterned illumination that is projected onto the object. The unique interaction of the illumination pattern with the object is then analyzed to determine the nature of the object present. In one example, "Three-dimensional object recognition by Fourier transform profilometry", by Esteve-Taboada et. al., Appl. Opt. (38), 4760-4765 (1999) describes a method for recognizing three-dimensional objects that combines the techniques of Fourier transform profilometry (FTP) and the Joint Transform Correlator (JTC). In the FTP method, a periodic grating is projected onto a surface or object using a projector, and its image (the reference image) is detected by a camera. The recorded image is subjected to Fourier analysis to determine the depth profile of the object.

In the JTC setup, the reference image is sent to a spatial light modulator (SLM), which is further placed inside a Fourier Optical Processor. The optical Fourier transform of the content displayed on the SLM appears at the output plane of the processor, which in turn is detected by a second digital camera. For recognition, the reference image is present on the SLM, while the object to be tested is placed into the FTP setup used to record the reference image. The image of the test object is now also sent to the SLM inside the JTC, alongside the reference image. This results in the cross-correlation of the reference object and the test object to be output by the JTC, which can be analyzed for recognition purposes by detecting correlation peaks at the output. Although useful, this technique has serious shortcomings when considered for the authentication problem, which include: increased speed of processing at the expense of increased complexity of the hardware; the possession of the reference object is required; the properties of the object shape are not taken into account in designing the best projected pattern, which is restricted to a periodic grating; the method is not extensible to colored objects; for the method cannot be easily extended to visual (human) authentication; and the method is not easily extended to a sequence of objects.

U.S. Publication No. 2003/0231788 (Yuhkin et. al.) describes techniques for high-speed observation and recognition of an object that is within, or passes through, a designated area, using 3D image data and a variety of 3D image capture techniques. The image capture techniques can include, but are not limited to, structured illumination. The method is based on the generation of feature vectors, which must be compared to a database for recognition.

A method termed inverse fringe projection is described by Bothe et. al. in the paper "Compact 3D-Camera" (Proc. SPIE vol. 4778, 48-59, 2002). The image of the patterned illumination reflected from the object is recorded by a digital camera. This image is mathematically inverted, such that when projected back at the object from the position of the capture, it reflects from the object to re-create the original illumination pattern at the site of the original projector, provided that the original object is present in its original position and orientation. The authors describe the use of such a system in manufacturing defect detection and quality control. Unlike previous methods, the inverse fringe projection method takes into account information about the shape of the reference object. The authors of the describe its use for compensation for the distortions of a projected image when projecting onto nonstandard surfaces, such as brick walls or corners in public spaces.

A similar technique is described in "Inverse Moire" by Jacques Harthong and Axel Becker, SPIE Vol. 3098, 1997, as a method of moiré metrology, where the shape of the object is measured by projecting a specific grid, inverse moiré, computed based on the knowledge of the object shape, allowing to analyze small deformations from a known mean shape with simple fringe processing. This contrasts to the standard moirémetrology approach wherein a pattern of parallel straight lines is projected onto the object surface, and the resulting pattern is analyzed using well known, though complex, fringe analysis techniques.

Structured light patterns are widely used for shape reconstruction, as described for example, in "A state of the art in structured light patterns for surface profilometry", by Salvi, Fernandez, Pribanic, and Llado, 2010, Pattern Recognition 43 (2010) 2666-2680. The process of shape reconstruction using structured light is considered one of the most reliable techniques to recover object surfaces. To accomplish this goal, a calibrated projector-camera pair is used and, a light pattern is projected onto the scene and imaged by the camera. Correspondences between projected and recovered patterns are found and used to extract 3D surface information. The projected pattern creates an illusion of texture on the surface of an object, thereby increasing the number of correspondences. They are chosen such as to uniquely codify each pixel position in the image and consequently, on the object surface.

A variety of structured light patterns to enable discrete and continuous codification for still and moving objects have been proposed. The attributes of the patterns employed for 3D surface reconstruction are a number of projected patterns, pixel depth, which is referred to the color and luminance level of projected pattern, periodicity of the set of patterns and others. Typical patterns consist of stripes (black and white or colored), sinusoidal gratings, luminance gradients with periodic or fixed spatial or temporal structure, and others. What is important, in all these cases patterns are used to obtain correspondences between object surface locations and pixels in the captured images, where subsequently the depth map of the object surface is reconstructed from pattern deformations using ray tracing and triangulation techniques. Unlike inverse fringe projection techniques, these patterns are not adapted to reflect 3D properties of a particular static or moving object, but are used as a means to reconstruct depth maps of object surfaces.

While these approaches take into consideration 3D surface information in designing projection patterns, they cannot be directly applied for authentication problems that are based on encoding information utilizing surface, embedding information into a surface and retrieving this information as a means of authentication for a variety of products including printed documents. Therefore, there is a need for methods to authenticate an object based on an automatic, noninvasive examination of its features and embedded information that can be concealed and modified as required.

SUMMARY OF THE INVENTION

Briefly, according to one aspect of the present invention a method for retrieving information encoded in a structured illumination pattern including selecting an encoded structured illumination pattern having a variable intensity; providing an object with a surface having a 3D relief pattern; selecting at least one portion but not all of the object's surface including the 3D surface relief pattern; projecting the selected structured illumination pattern onto the selected portion of the surface; using a digital camera to capture an image of the reflected structured light pattern from the selected portion of the surface; storing the image in a memory; and processing the image of the detected reflected structured light pattern using a processor responsive to the detected reflected structured light pattern and the selected structured light pattern to retrieve the encoded information, wherein the encoded information is based on the geometrical and material properties of the 3D surface relief pattern and is distinct from the object, surface, or relief pattern.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 4a and 4b are examples of the information selected to be encoded in the illumination pattern.

FIG. 14 is a flow diagram of another embodiment of the method for authenticating an object using information encoded in a structured illumination pattern, in accord with the present invention.

DETAILED DESCRIPTION OF THE INVENTION

Figure 1:
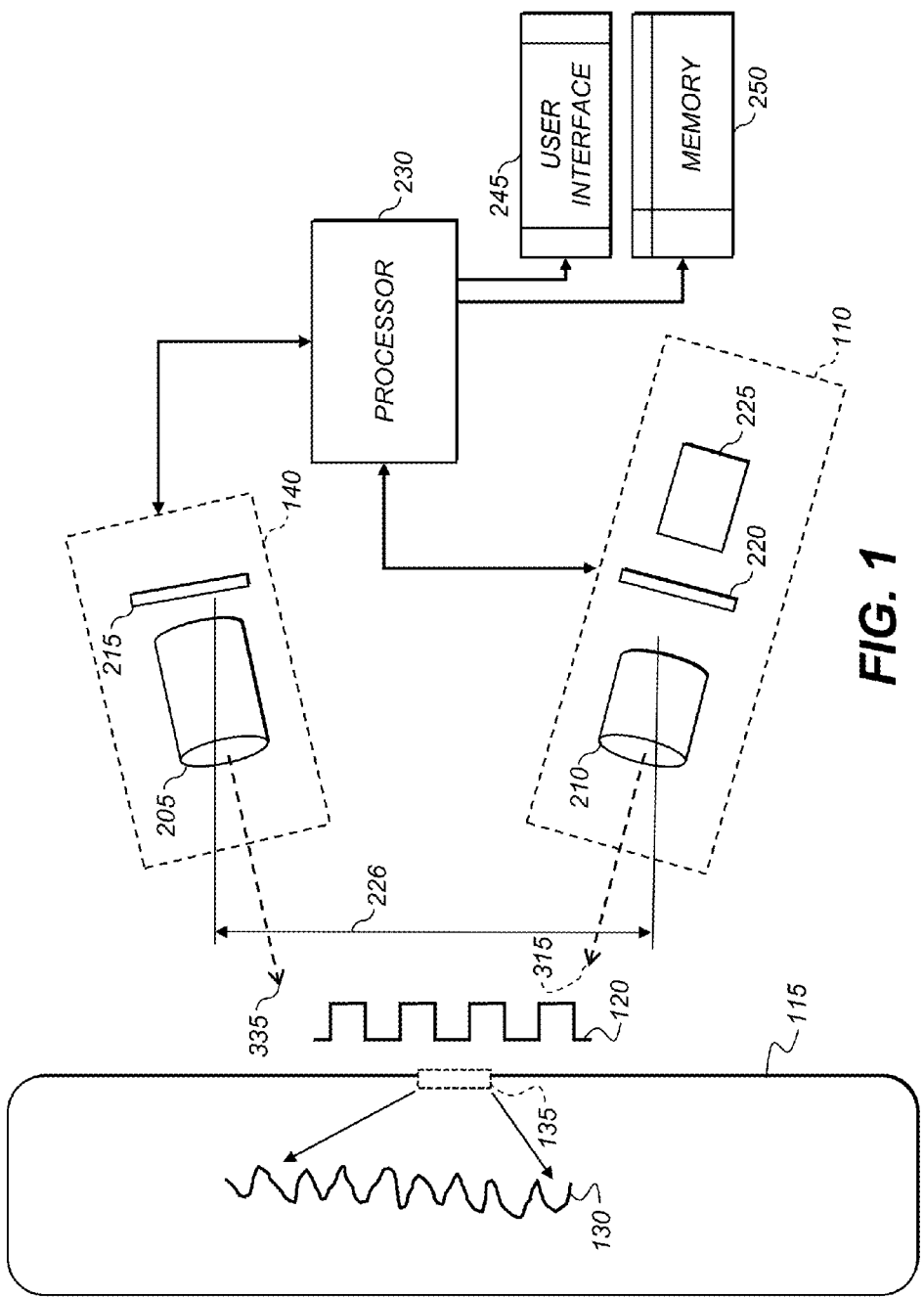
FIG. 1 is a flow diagram of a method for encoding information in a structured illumination pattern.

The present invention will be directed in particular to elements forming part of, or in cooperation more directly with the apparatus in accordance with the present invention. It is to be understood that elements not specifically shown or described may take various forms well known to those skilled in the art.

In order to ensure a robust encoding, and data retrieval that are applicable for a range of objects and items, as well as usages such as authentication, the preferred embodiment of the present invention focuses on three key elements: information to be encoded, a specified surface texture that is identified, created or modified on the surface of the object or an item, and which is used in the process of encoding, retrieving and/or decoding information, and structured light pattern, which carries encoded information and is applied on the specified surface texture in order to retrieve and/or decode the information. All three elements are specified, designed and utilized in a complimentary fashion, by taking into consideration their respective characteristics and properties in the process of encoding.

In the context of the present invention we understand the term information to mean images, text, characters, numbers, codes in various formats, symbols, data or geometrical patterns. Such information can be related to or carry a certain meaning or association with respect to the object or an item, for example, in the form of a tag or metadata or other data relevant to the object or object characteristics or usage. Examples of such relevant information include time and date of the object manufacturing, a company that produced the object, data authenticating the object, information about the object's usage and specifications, historical information about the object, information about the object's owner, or a World Wide Web address to databases with the description and knowledge about the object. Alternatively, the information can be unrelated to the object.

Examples of this type of information include but are not limited to a map of the local area, or a message to a person, or a group, enabled to decode it. In any case the object and object's surface texture are used together with the structured light to encode and decode information.

Encoding is defined as the conversion of information from one system of communication or representation into another, and especially, the conversion of a message or other type of information into code. To access encoded information the inverse process of decoding is required, wherein the specifics of the decoding depends on the details of the encoding process and can include access to a key. A key is a piece of information or a parameter that determines the output of an encoding or decoding method, process or algorithm.

By structured light or structured illumination it is meant that a pattern of projected visible or non-visible radiation. The terms structured light, structured light pattern, structured illumination, and structured illumination pattern are used interchangeably in the context of the present invention.

By the surface texture it is meant that the surface or a specific portion of the surface of the object or item, which is employed in the process of encoding and retrieval or decoding information, and which has an associated three-dimensional or relief pattern.

The relief characteristics of the object surface or a specific portion of the surface, are used for information retrieval. Surface characteristics include, but are not limited to, physical dimensions of the three-dimensional relief, geometrical arrangement of pattern elements, and size or scale of relief patterns. Relief characteristics also include material properties of the surface texture, characterized by their reflectance, transmittance and absorbance of light of different wavelengths, which together with the relief characteristics can uniquely identify the object, a type of objects or a family of objects.

These properties of the surface texture are specifically designed, selected, determined or created, to be unobvious and unrecognizable without an inspection mechanism. The surface or portion of the surface that is used in the process of encoding information or data or metadata or tags can be called critical surface texture, critical surface texture pattern, critical surface pattern, or, simply, critical surface. In describing these types of surface properties, we can also use the terms such as critical surface (or texture or relief) features and elements.

In some embodiments, the surface texture used for encoding and decoding information into and from a structured illumination pattern is specifically selected or designed at the stage of producing the object. This way the identified surface becomes an intrinsic part of the object itself. Any physical 3D object having a surface texture which differentiates it from similar objects can be utilized in an encoding process provided that the relief characteristics are within the specifications of the process.

In other embodiments, the texture can be added to the object at a later stage, therefore requiring a purposeful object modification, for example, while printing the document or post-manufacturing retouching of the object. However, unlike in the cases of a barcode or an RFID tag, the texture is added at a micro or intermediate scale levels, rather than a macro scale level, without disruptive change of the object appearance, thus, effectively becoming a part of the object. A printed image or a document with the 3D texture pattern deposited or embossed on the print surface is an example of such an object.

The information retrieval or decoding mechanism employed in the present invention is structured light or structured illumination. A pattern of the structured light or structured illumination is projected onto the critical surface texture. The structured illumination pattern is co-designed, selected, determined or created with the critical surface texture, and carries encoded information. The critical surface texture and the structured illumination pattern, can be considered to act as a lock and a key in the encoding and information retrieval process. Both the structured illumination pattern and the critical surface texture are needed to encode and decode the information that is used for, tagging, digital watermarking, steganography, and other applications. The structured illumination pattern is specifically designed such that its application will result in accessing and retrieving the encoded information.

The designed structured illumination pattern also takes into consideration the properties of the information to be encoded or retrieved, and is scrambled or distorted with respect to the target information. the pattern is constructed such, that the final output information or output signal, that is retrieved cannot be easily accessed, recognized or guessed from the structured illumination pattern itself, without reference to the surface texture used to create it. In the preferred embodiment of the present invention the encoded information can be text, characters, numbers, images, or other types of information such as symbols or geometrical configurations. The information itself can be selected or defined in conjunction with the surface properties and structured illumination. Alternatively, information can also be represented as codes, encoded in various ways and forms, such that when this code or codes are retrieved they may further be processed and decoded if desired, similarly to digital watermarking and steganography applications. In the context of the present invention it is useful to differentiate two aspects of information: its content or meaning of what is being communicated (for example, the meaning of a word or a text message), and the physical form in which information is represented (for example, printed characters having particular size, thickness or color). The structured illumination pattern can be monochromatic or polychromatic, and can include spectra of the wavelengths beyond visible, for example, infrared or ultraviolet. The inclusion of non-visible wavelengths may be important when the critical surface texture contains features and elements that selectively absorb or reflect non-visible wavelengths, or that, phosphoresce or fluoresce responsive to the structured illumination. This enhances the ability to encode data using structured illumination, as well as increase the sophistication of the encoded information.

The structured illumination pattern and the information contained therein can be described in terms of complexity, entropy, spectral content, spatial resolution, size, and or other parameters or characteristics known in the art. The structured illumination patterns can be stored as digital data files, digital image files or digital video files. In the latter embodiment the structured illumination is organized as a series of patterns sequentially projected in frames of the video file onto the object surface following a prescribed order. Alternatively, a set of structured light patterns can be combined in a composite image for projection, where individual parts of the composited structured illumination pattern constitute separate frames stored as a video file. Encoded information in such a case is organized in such a way, that individual portions of information are retrieved in a sequence of steps as separate frames, which can be observed and/or captured using imaging devices including digital still and video cameras, spectrometers and spectrophotometers, mobile devices equipped with the digital still and video cameras and other imaging mechanisms, and different types of scanners depending on the geometrical and material properties of the object and surface of interest. Subsequently, such individual frames, parts or portions of obtained information can be optionally combined, stored as digital files and processed in a number of ways, such as creating video, or image sequence, or by overlaying, compositing, averaging, subtracting and/or using various other operations and techniques typically employed in image processing and analysis. In the embodiment, wherein the structured illumination pattern or patterns are stored as digital data files in a computer memory, the stored data can be used to reconstruct illumination patterns.

In one configuration, the retrieved information is used for authenticating the object. The authentication includes comparing the retrieved information with stored data pertaining to the authentic reference object. In other words, the authentication is based on whether there exists or does not exist a match between stored data pertaining to the known reference authentic object and the information retrieved from the object under consideration or inspection.

If the retrieved information requires additional decoding, known decoding and cryptographic techniques can be used to retrieve and decode the data. For example, tables, alphabets, or searching methods can be applied to associate codes with online databases and Internet websites, via IP addresses, URL or passwords, where more information can be found. Alternatively, encoded information can be also used for other purposes, such as providing data related to the object, such as the dimensions, composition, content, the owner or manufacturer of the object, usage instructions, including storage characteristics, environment, safety precautions, etc. In other embodiments, information can contain data unrelated to objects, such as secret messages, instructions, history data about place, people, and other types of information.

The present invention can be implemented in computerized equipment and computer hardware. For example, the method can be performed using a computerized system including one or more digital cameras or other capture devices, one or more digital projectors, and one or more personal computers or other suitable electronic devices, wherein the devices have the capability to store and project structured illumination patterns and images, and capture images of reflected patterns after projection, store and analyze these captured image, and transmit the images wirelessly, or via connection to online Internet or Ethernet sites or computerized databases.

FIG. 1 shows a schematic of a system for encoding information in a structured illumination pattern, in accordance with the present invention. A projector 110 is used to project an illumination pattern 120 onto an object 115 from a projection direction 315. The illumination pattern 120 can include a single still image or pattern, a sequence of still images or patterns, a video sequence, or a series of video sequences. An image of the object 115 is captured using a digital camera 140 from a capture direction 335. The capture direction 335 can be different from the projection direction 315. In this case the projector 110 and digital camera 140 are separated horizontally along a baseline 226 in order to provide depth information according to the parallax effect. A sequence of one or more of different illumination patterns 120 is projected onto a selected portion 135 of the object's surface that includes a relief pattern 130. The camera 140 captures an image corresponding to each of the projected illumination patterns.

The phrase "digital camera" is intended to include any device including a lens which forms a focused image of a scene at an image plane, wherein an electronic image sensor is located at the image plane for the purposes of recording and digitizing the image. These include a digital camera, cellular phone, digital video camera, surveillance camera, web camera, television camera, electronic display screen, tablet or laptop computer, video game sensors, multimedia device, or any other device for recording images.

The phrase "processor-accessible memory" is intended to include any processor-accessible data storage device, whether volatile or nonvolatile, electronic, magnetic, optical, or otherwise, including but not limited to, registers, floppy disks, hard disks, compact discs, DVDs, flash memories, ROMs, and RAMs.

The phrase "communicatively connected" is intended to include any type of connection, whether wired or wireless, between devices, data processors, or programs in which data is communicated. Further, the phrase "communicatively connected" is intended to include a connection between devices or programs within a single data processor, a connection between devices or programs located in different data processors, and a connection between devices not located in data processors at all.

The projector includes a light modulator 220, which is a digitally addressed, pixelated array such as a reflective LCD, LCoS, or Texas Instruments DLP™ device, or a scanning engine, which is projected onto the scene by a projection lens 210. Many illumination systems for such modulators are known in the art and are used in conjunction with such devices. FIG. 1 shows an illumination system 225 that illuminates the modulator 220. The illumination system 225 may include sources such as incandescent lamps, light emitting diodes (LEDs), lasers or laser diodes with associated collimating or condensing optics. The structured lighting system comprised of the capture lens 205, image sensor 215, projection lens 210 and light modulator 220 can operate in visible or non-visible light. In one configuration, near-infrared illumination is used to illuminate the scene objects, which is less distracting to people who are in the scene, provided that the intensity is kept at safe levels. Use of infrared wavelengths is advantageous because of the native sensitivity of silicon based detectors at such wavelengths.

The projector can also be included within an electronic device, such as a digital camera. The Nikon COOLPIX S1200pj digital camera is one example of a digital camera that includes a built-in projector. In another configuration, the projector can be built into a mobile phone or other personal electronic device, such as a tablet or notebook computer, PDA or other suitable device.

The projector is communicatively connected to a processor 230, which can be an integral part of the projector, be a part of a larger device, which has the projector as its part, or, alternatively, the projector can be connected wirelessly or through the wired connection to a separate computer (not shown) having a processor.

The camera 140 is communicatively connected to the processor 230 that communicates with the image sensors 215, and light modulator 220. The camera 140 further communicates with a user interface system 245, and a processor-accessible memory system 250 via the processor 230, which is communicatively connected to the processor-accessible memory system 250 and the user interface system 245.

Although the processor-accessible memory system 250 is shown separately from the processor 230, one skilled in the art will appreciate that it is possible to store the processor-accessible memory system 250 completely or partially within the processor 230. Furthermore, although it is shown separately from the processor 230, one skilled in the art will appreciate that it is also possible to store the user interface system 245 completely or partially within the processor 230.

Through the processor 230, the processor-accessible memory system 250 and the user interface system 245 are also communicatively connected to the projector 110.

In one configuration, such as the one shown in FIG. 1, the processor 230, memory 250 and the user interface 245 are separate from the camera 140 and projector 110. In this case, the processor 230, the memory 250 and the user interface 245 can be a part of one or more separate devices, such as, for example, a personal computer or other suitable computing devices. In other configurations, a memory 250 and user interface 245 can also be located within or on the camera 140, and a separate memory 250 and user interface 245 can also be located within or on the projector 110. In yet still other configurations, all components including the projector 110, the camera 140, the processor 230, the memory 250 and the user interface 245 can be integrated in one hardware system.

The processor 230 can include one or more data processing devices that implement the processes of the various embodiments of the present invention. The phrases "data processing device" or "data processor" are intended to include any data processing device, such as a central processing unit (CPU), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory system 250 includes one or more processor-accessible memories configured to store information, including the information needed to execute the processes of the various embodiments of the present invention. In some configurations, the processor-accessible memory system 250 is a distributed processor-accessible memory system including multiple processor-accessible memories communicatively connected to the processor 230 via a plurality of computers or devices. In some configurations, the processor-accessible memory system 250 includes one or more processor-accessible memories located within a single data processor or device.

In this regard, although the processor-accessible memory system 250 is shown separately from the processor 230, one skilled in the art will appreciate that it is possible to store the processor-accessible memory system 250 completely or partially within the processor 230. Furthermore, although it is shown separately from the processor 230, one skilled in the art will appreciate that it is also possible to store the user interface system 245 completely or partially within the processor 230.

The user interface system 245 can include a touch screen, switches, keyboard, computer, or any device or combination of devices from which data is input to the processor 230. The user interface system 245 also can include a display device, a processor-accessible memory, or any device or combination of devices to which data is output by the processor 230. In this regard, if the user interface system 245 includes a processor-accessible memory, such memory can be part of the processor-accessible memory system 250 even though the user interface system 245 and the processor-accessible memory system 250 are shown separately in FIG. 1.

Figure 2:
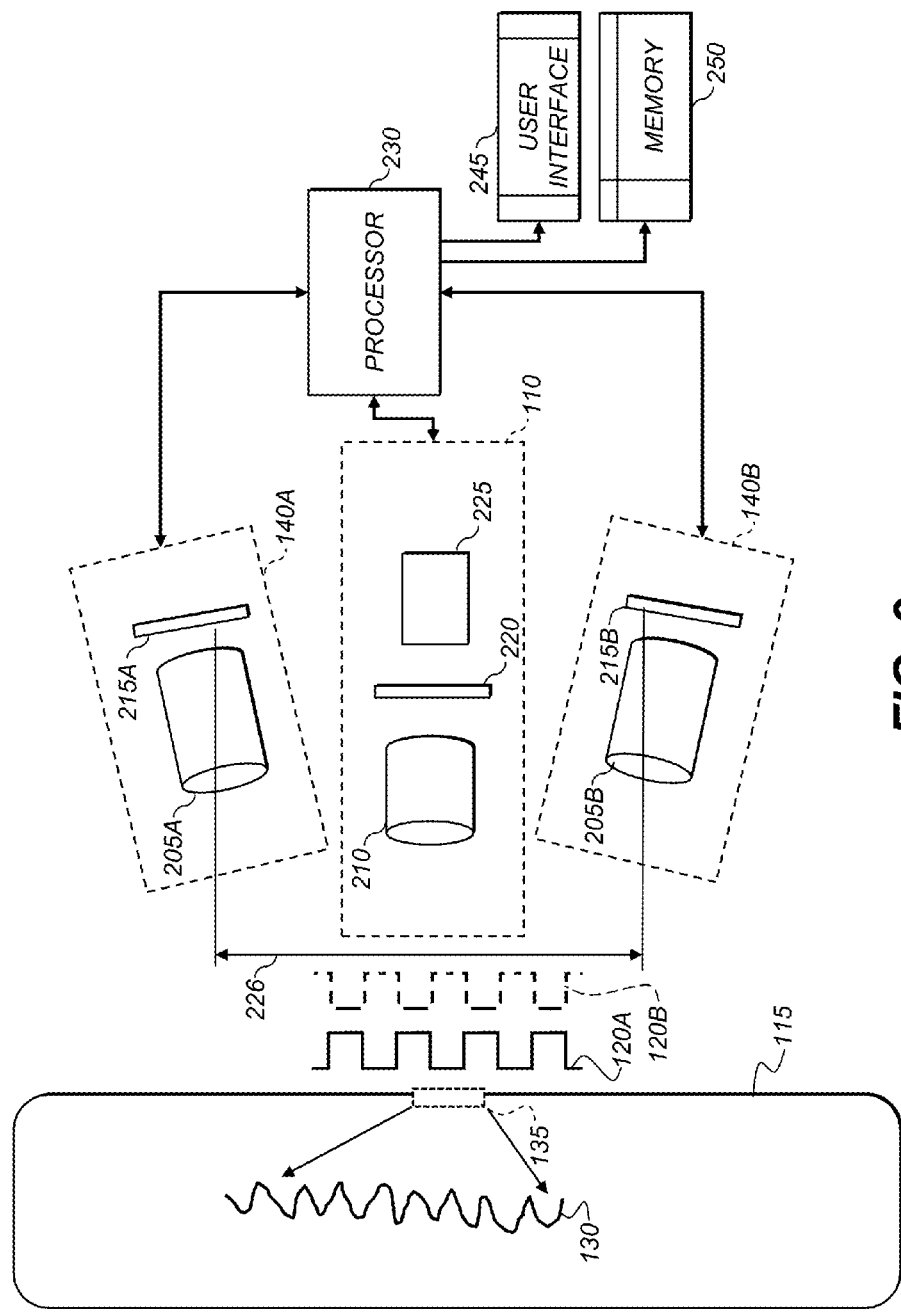
FIG. 2 is an example of the method for characterizing a relief surface of the object using structured light system.

In an alternate configuration shown in FIG. 2, two digital cameras 140A and 140B are shown separated by a horizontal baseline 226, on alternate sides of the projector 110, which projects a structured light pattern 120A onto the object 115. The two cameras 140A and 140B include capture lenses 205A and 205B, and image sensors 215A and 215B, and both cameras are communicatively connected to the processor 230, the user interface system 245, and the processor-accessible memory system 250. Using two cameras with matched optical and electronic characteristics, in conjunction with the different perspectives of the two cameras relative to the position of the projector 110, provides additional depth information pertaining to the surface texture 130 according to the parallax effect.

As described earlier, the illumination system 225 can operate in visible or non-visible light. Similarly, the digital cameras 140A and 140B can have spectral sensitivities that are tuned to visible or non-visible light, and can be tuned to matching regions of the spectrum, partially overlapping regions of the spectrum, or non-overlapping regions of the spectrum. In FIG. 2, an additional illumination pattern 120B is shown, represented in the figure by a different line style. In this configuration, pattern 120A is created by the projector 110 and is detected by camera 140A, while pattern 120B is created by the projector 110 and is detected by camera 140B. Illumination patterns 120A and 120B may be projected simultaneously or in sequence. Depending on the spectral content of patterns 120A and 120B, and the spectral sensitivities of digital cameras 140A and 140B, the two cameras may record all, part or none of the reflected energy from each of the illuminating patterns. In this manner, the surface texture 130 can be characterized simultaneously, or in succession, in different regions of the spectrum. In some configurations, the cameras 140A and 140B have matching optical and electronic characteristics, such as sensor resolution, f-number of the camera lens, and focal length, while in other configurations these are mismatched.

Images captured with the camera 140 and illumination patterns 120 of FIG. 1 or illumination patterns 120A and 120B and images captured with the cameras 140A of FIG. 2, can be stored in the form of files of data or files of digital images. A digital data file refers to any computer file, that is, a file maintained in computer-readable form. Such files can contain any type of data, for example, a word processing document or spreadsheet, image or video data. An image data file pertains to files containing information on digital images.

A digital image includes one or more digital image channels, digital image bands or color components. Each digital image channel is a two-dimensional array of pixels. Each pixel value relates to the amount of light received by the imaging capture device or projected by a projector device corresponding to the physical region of pixel. For typical capture and projection devices, a digital image will often consist of red, green, and blue digital image channels. When more spectral bands are utilized for capture and projection, the digital images files may contain many bands wherein each band corresponding to a certain regions of captured and or projected spectral light. Video or moving images can be thought of as a sequence of digital images. Although a digital image channel is described as a two dimensional array of pixel values arranged by rows and columns, those skilled in the art will recognize that the present invention can be applied to non rectilinear arrays with equal effect. Images are stored in the processor-accessible memory 250. The processor-accessible memory can also store a computer program in a form of software that can be required to project, capture, process and analyze digital data and or digital images.

It should also be noted that the present invention can be implemented in a combination of software and hardware and is not limited to devices, which are physically connected and/or located within the same physical location. One or more of the devices and parts illustrated in FIG. 1 and FIG. 2 can be located remotely and can be connected via a network. One or more of the devices can be connected wirelessly, such as by a radio-frequency link, either directly or via a network.

Figure 3:
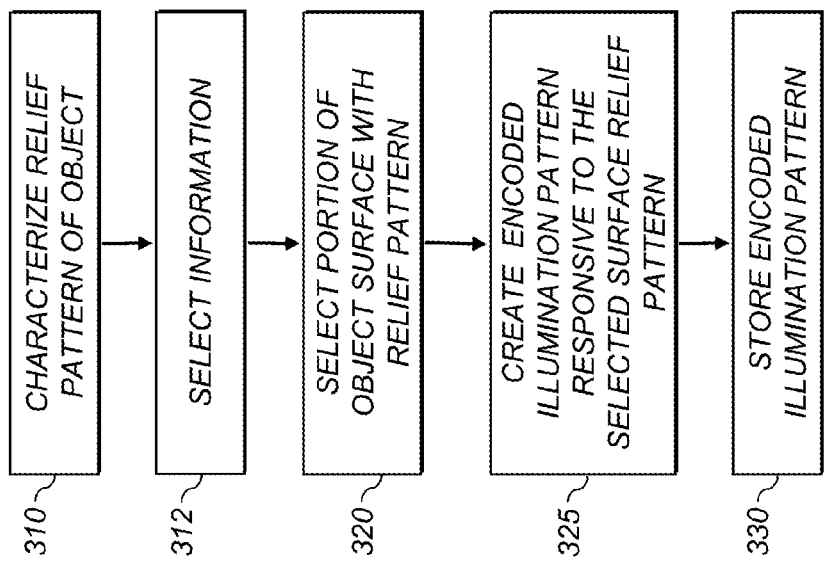
FIG. 3 is an example of the critical surface characteristics.

FIG. 3 shows a process diagram for a method of creating an encoded illumination pattern in accord with the present invention. Beginning with step 310, the surface relief of the object is characterized. Characterizing a relief pattern of an object's surface includes forming a 3D model of the relief pattern using the system of FIG. 1 or FIG. 2. In a preferred configuration, this is accomplished using a structured lighting technique such as those described in commonly assigned, co-pending U.S. patent application Ser. No. 13/070,849 (and U.S. patent application Ser. No. 13/004/196 (hereafter, '196). Returning to FIG. 1, a sequence of patterns 120 are projected using the projector 110 onto the object 115. The sequence of patterns 120 can include, but is not limited to, spatially periodic binary patterns such as Ronchi Rulings or square wave gratings, periodic gray scale patterns such as sine waves or triangle (saw-tooth) waveforms, or dot patterns.

In a preferred configuration described in the '196 application, the sequence of patterns 120 includes both spatially periodic binary and grayscale patterns, wherein the set of periodic grayscale patterns each has the same frequency and a different phase, the phase of the grayscale illumination patterns each having a known relationship to the binary illumination patterns. The sequence of binary illumination patterns is first projected onto the scene, followed by the sequence of periodic grayscale illumination patterns. The projected binary illumination patterns and periodic grayscale illumination patterns share a common coordinate system having a projected x coordinate and a projected y coordinate, the projected binary illumination patterns and periodic grayscale illumination patterns varying with the projected x coordinate and being constant with the projected y coordinate. In this preferred configuration, the sequence of binary patterns are the well-known gray code patterns, and these are used to obtain a coarse estimate of the locations in the projected illumination patterns 120 that correspond to the pixel locations in the images of the binary patterns captured by the digital camera 140 on the image sensor 215. The sequence of grayscale patterns is a set of three sinusoidal intensity patterns that are identical, except that the second and third patterns are shifted in phase by ⅓ and ⅔ of a period relative to the first pattern. Furthermore, in this preferred embodiment, the phase of the projected sinusoidal patterns is arranged such that the maximum of one of the patterns (i.e. crest of the waveform) is aligned with the transitions between the on/off regions in the gray code patterns. In this way, the sinusoidal patterns can be used to refine the estimates of the locations in the projected illumination patterns 120 that correspond to the pixel locations in the images of the binary patterns captured by the digital camera 140 on the image sensor 215, filling in the values between the coarse estimates. Full details of this method are provided in the '196 application.

Once the mapping from projector to camera is established, methods known in the art can be used to compute range or depth values that correspond to a 3D characterization or mapping of the relief pattern 130. The '196 application describes the details of this process. Such 3D characterization of the surface texture in the form of the three-dimensional model of the object's surface is stored in the memory 250.

Additionally, other information related to the surface texture, such as spectral and material properties can be acquired and stored in the processor accessible memory 250 as a part of the model or separately. Spectral information can be acquired using structured light system of FIG. 1 or FIG. 2, wherein the projected light patterns 120 can be adapted to include patterns of specifically selected wavelengths, including the non visible parts of the spectrum. Alternatively, spectral properties of the object surface can be measured using commercially available devices such as for example, the PR-655 SpectraScan Spectroradiometer sold by Photo Research, Inc. Information about material properties can be obtained from the manufacturer or via special analysis techniques typically employed in analytical science. These methods analyze small quantities of objects' material substance by applying techniques of mass spectroscopy, gas chromatography or other advanced analytical methods. In another embodiment, the characterization of the surface relief can be pre-determined in terms of the manufacturing specifications and available at the step 310 in the form of a data file. In yet other embodiments, techniques of profilometry, elipsometry or other tools and methods can be applied to acquire the object's three-dimensional surface relief characterization.

Figure 4B:
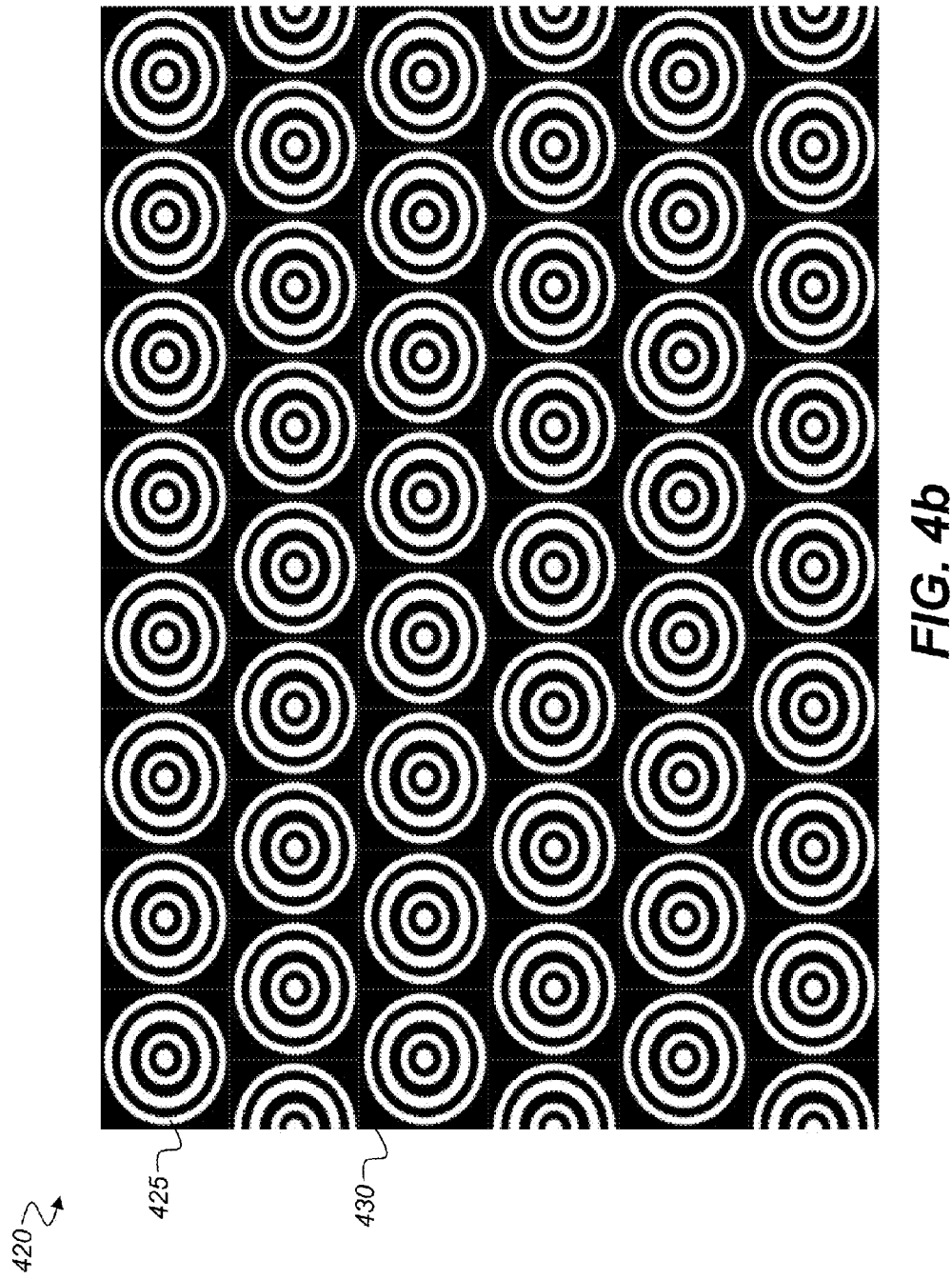

FIG. 4a shows an example of a surface with a relief pattern that can be used for information encoding, in accord with the present invention. FIG. 4a shows a schematic of a substrate 400 with an array of surface relief elements, in particular relief elements 405, 410, and 415, each element composed of a series of concentric, raised rings. All dimensions in the figure are given in inches. The upper left corner of FIG. 4a shows a cross sectional view of elements 405 and 410 that indicates the height of the rings above the substrate. FIG. 4b shows a binary image representation 420 of the surface of FIG. 4a, where the pixel brightness corresponds to height above the substrate. That is, white pixels 425 represent maximum surface height, and black pixels 430 represent zero surface height above the substrate. A binary image such as 420 can be stored in computer readable memory as a digital image file, and sent to a writing device to fabricate a textured surface.

Returning to FIG. 3, in step 312, the information for encoding is selected. The selection process is based on the specific application for the encoding, as well as surface relief characteristics. For example, if the encoding is used for authentication of the object, and the selected critical surface texture contains surface relief characteristics that uniquely identify and differentiate the object from similar objects, the information for encoding can be selected such that its content takes into consideration the manufacturer of the object, date and time of the object creation, its important usage instructions, etc. At the same time, the physical embodiment of the information is chosen to correspond to the critical surface characteristics, such as, for example, its geometrical and material properties, including the surface depth variation, spatial frequency of the surface 3D features and or its reflectance or absorption spectra. It is important to recognize that the geometrical and material properties of the surface relief pattern can influence the selection of how information is physically represented. It stems from the desirability of a requirement that the output encoded information satisfies a specific criterion, for example, how easily the information can be accessed and decoded from its encoded form. In the preferred embodiment of the invention, the selected information, especially, its physical representation is chosen in step 312 to satisfy the specific criterion of the amount of distortion that can be created when the original information in the form of a pattern of illumination is projected onto the surface texture. In other embodiments selection criteria can also include spectral composition, text language, visual complexity and other relevant criteria which can be linked to such considerations as whether the information will be retrieved manually, or automatically, by visual inspection of the projected illumination pattern, or by computational analysis of the captured projection of the pattern, and other relevant considerations.

Figure 5:
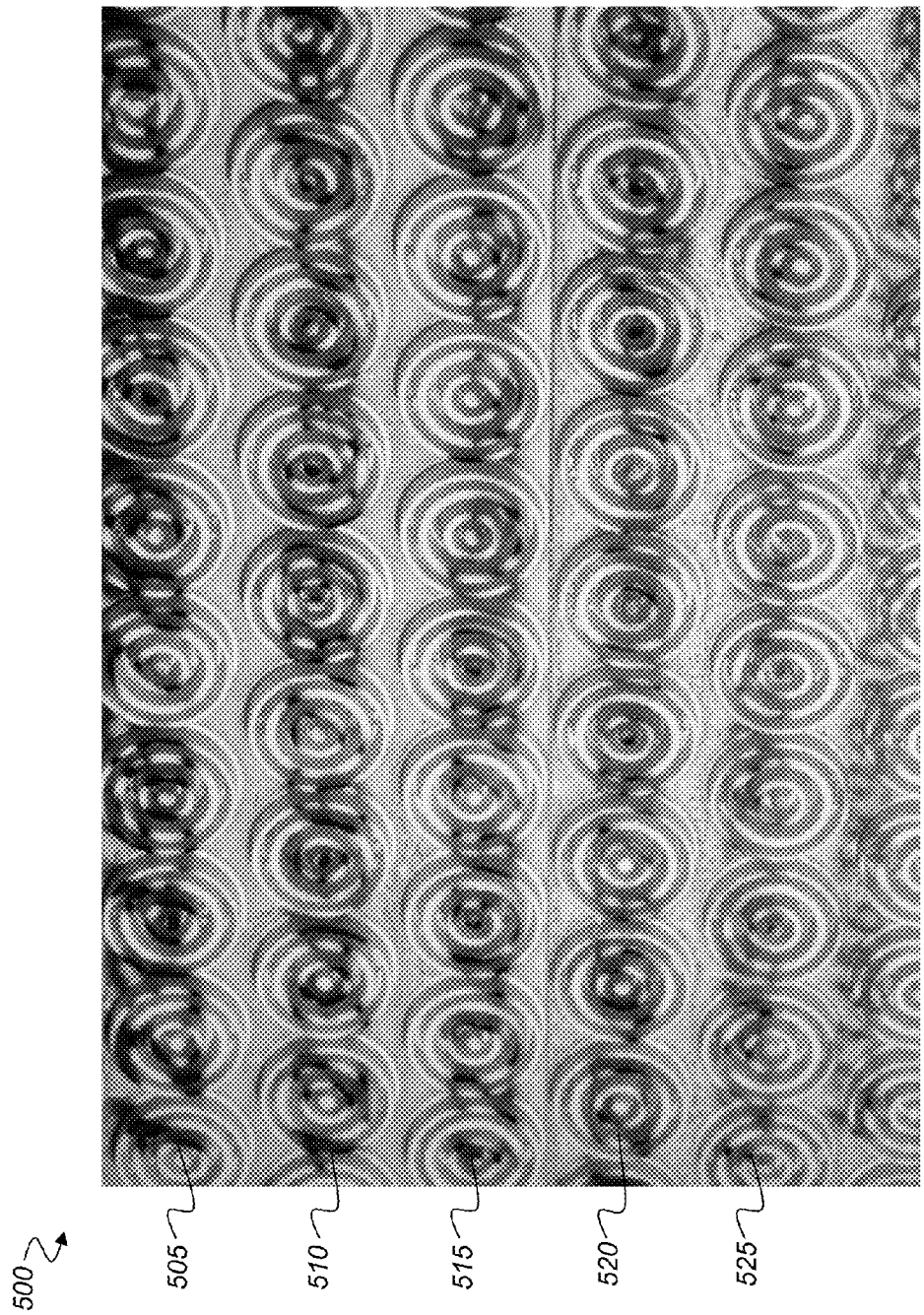
FIG. 5 is an example of the structured illumination pattern with encoded information applied to the critical surface.

FIG. 5 illustrates one embodiment of a method for selecting the information to be encoded, in accord with the present invention. Specifically, this example illustrates how physical characteristics of the information can be selected with specific unrecognizability or illegibility criterion when the content of information is a text message. In general, when the font size is large in comparison with the parameters or features of the surface elements the amount of apparent distortion created by the surface is small. As the font size is reduced, the amount of distortion introduced by the surface relief pattern increases. FIG. 5 shows a photograph of a critical surface texture 500, consisting of a substrate with an array of surface relief elements, similar to the schematic of FIG. 4a. The surface texture 500 has a uniformly diffuse white coating. Projected onto the rows of surface relief elements are rows of characters of varying font size. Row 505 is the largest row, and shows very little distortion by the surface relief. The next row 510 is smaller, and while it shows more distortion can still be easily read. The next row 515 is smaller yet, but can be read with some difficulty. The smallest rows, 520 and 525 is yet smaller, and are very difficult to read. Note that rows 520 and 525, have a font size on the order of the feature size of the individual surface relief elements.

The amount of distortion introduced depends on the relative geometrical parameters of the surface texture, and the physical characteristics of the information. In the preferred embodiment, the amount of distortion can be assessed visually. In such an embodiment, a distortion visibility threshold can be specified such that the threshold is exceeded, the information is unrecognizable. The distortion visibility threshold can be directly related to the underlying parameters of the information, such as the font size, that can in turn be used to directly specify the distortion visibility threshold.

Alternatively, the amount of distortion can be assessed using methods of computer vision, where the captured distorted information is analyzed with the goal to retrieve and or recognize information. In such a case, typical performance characteristics describing computer vision and image analysis algorithms can be evaluated. For example, precision and recall are accessed and used in order to satisfy an unrecognizability criterion, and consequently select information for encoding. Corresponding thresholds related to the distortion and underlying physical characteristics of the information, can also be established. Alternatively, information can be selected via the process of modeling the potential distortion introduced by the specified surface characteristics and using a pre-established threshold.

Returning now to FIG. 3, in step 320, one or more specific portions of the surface relief pattern in selected. In this step, a process similar to the process described in step 315 can be employed. In particular, a specific portion of the surface relief pattern can be selected to provide a sufficient degree or amount of distortion introduced by the portion of the surface relief pattern to the information. To this end various candidate portions of the surface relief pattern are evaluated by assessing the amount of distortion corresponding to each portion of the surface. Next, the portions are compared with respect to the corresponding amount of distortion and the portion with the highest amount is chosen. In the preferred embodiment, a visual evaluation can be performed. In alternative embodiments, model-based evaluation or automatic evaluation using captured images of projected information on different surface relief portions can be used. In other embodiments, the surface portion selection criteria can include, for example, the presence of unique surface characteristics representative of the object, which are contained in the portion under selection consideration, including spectral, material and geometrical characteristics of the surface texture or surface relief pattern.

Information can be divided into parts, fragments or frames. Consequently, several portions of the surface texture can be selected for the encoding, wherein different selected portions can be used for encoding parts or fragments of information. For example, if the information consists of several frames of digital images or several data files, each piece of information can be associated with one or more selected portions of object's surface texture with the corresponding relief pattern. In such embodiment each of the portions can be selected by applying different criteria and different evaluation methods, which are the most appropriate for corresponding parts of information.

Returning to FIG. 3, the next step 325 involves creation or construction of one or more illumination patterns with encoded information responsive to the selected sections of the surface. In the preferred embodiment this step can be accomplished using a method such as an inverse projection method. Accordingly, within this step 325, using structured lighting techniques, first the mapping between projector coordinates and camera coordinates is determined. This mapping can be obtained directly from the methods described in the '196 patent application. Conceptually, the forward mapping is represented by a pair of two-dimensional functions u(x,y) and v(x,y), where x,y are spatial coordinates in the light modulator plane 220, and u,v are spatial coordinates in the image sensor plane 215. The functions u and v contain information about the three-dimensional object 115 and its textured surface 130, and are a mapping of the light rays leaving the modulator at x,y and arriving at the sensor at u,v. In practice, sampled functions $u_s(x_i,y_j)$ and $v_s(x_i,y_j)$ are measured at discrete pixel locations $x_i,y_j$ and $u_n,v_m$ in the corresponding planes. The sampled functions $u_s(x_i,y_j)$ and $v_s(x_i,y_j)$ are simply mappings between the columns and rows of pixels in the two planes. For completeness, the grayscale responses of the projector 110 and the digital camera 140 must also be measured.

Once the forward mappings u(x,y) and v(x,y) (or their sampled counterparts $u_s(x_i,y_j)$ and $v_s(x_i,y_j)$) are known, for any image $I_{proj}(x,y)$ at the projector we can calculate the resulting image $I_{cam}(u,v)$ at the camera, which is a distorted or warped version of $I_{proj}(x,y)$, after reflection from the surface texture 130. It is this image $I_{cam}(u,v)$ which can be used as the starting point for information encoding. To encode information using the surface texture 130, the inverse transformations X(u,v) and Y(u,v) are computed. Physically, these transformations describe, for a given location u,v in the image sensor plane, the corresponding location in the projector plane x,y that illuminates the location u,v. In practice, discrete (sampled) versions of these transformations are computed. To simplify the notation, will refer to X(u,v) and Y(u,v), with the understanding that in practice the quantities u,v and X,Y are discrete rather than continuous.

A variety of methods may be used to compute the inverse transformations X(u,v) and Y(u,v), depending on the complexity of the surface texture 130. One method is proposed by W. Li et. al. in *Object adapted pattern projection—Part 1: generation of inverse patterns*, published in Optics and Lasers in Engineering vol. 41, pp. 31-50 (2004). This method works in the projector space (X,Y), where the data are on a rectangular grid, and sequentially processes neighborhoods of four projector pixels. Numerical values for the four pixels are interpolated from the surrounding camera pixels, which can lie on a non-rectangular grid when viewed from the projector space. The interpolation coefficients are recomputed for each neighborhood, and the interpolation is performed using a linear model.

Once the inverse transformations X(u,v) and Y(u,v) are known, it is then possible, given an image $I_{cam}(u,v)$ at the camera to compute the corresponding image $I_{proj}(x,y)$ that must be input to the projector to result in the image $I_{cam}(u,v)$ at the camera. Therefore, given the surface texture 130, and the inverse transformations X(u,v) and Y(u,v), the information to be encoded is specified as the image $I_{cam}(u,v)$. The encoded information is then embedded in the corresponding image $I_{proj}(x,y)$. The image $I_{proj}(x,y)$ may be regarded as a structured illumination pattern with encoded information. Note that the forward transformations u(x,y) and v(x,y), and the inverse transformations X(u,v) and Y(u,v), are specific to the digital projector and the digital camera used, as well as the critical surface texture. This dependence includes the relative positions of these devices, in terms of their distances and angles, with respect to the surface. Changes in any of these parameters will affect the retrieval of information from the system. In addition, changes in these parameters will require a recomputation of the forward and inverse transformations.

Other ways to create encoded illumination patterns responsive to the selected sections of the surface can utilize modeling and simulation techniques using computer means, including computer graphics techniques that are widely utilized in 3D graphics design and programming for computer gaming, animation and CAD systems. For example, the surface models and ray tracing techniques can be used to simulate an 3D inversion of the surface relief pattern and projection of the selected information in the form of an image onto the modeled inverted surface. Recorded simulated reflection via computing inverted selected area of the surface texture with the surface relief pattern, and recording the simulated reflection of the simulated or visualized projection. Since the selected portion or portions of the surface texture with the relief were chosen such as produce a distortion.

Additionally, spectral properties of the structured light pattern may be chosen such that they selectively interact with absorption, transmission and reflectance properties of the surface relief pattern. For example, the structured light patterns can be created to include colors that match or are complimentary to the colors of the surface relief pattern. If these patterns are projected onto the surface, color information in the reflected pattern will be modified: in can become more vivid if colors match, or will appear achromatic if colors are complimentary. Alternatively, the structured illumination pattern can be designed to stimulate the emission of radiation from the object's surface, when the object's surface material can fluoresce or phosphoresce.

Once illumination patterns are created in step 325 responsive to the selected surface relief patterns that contain encoded information, in step 330 they are stored in the memory of the computer or other computerized equipment or transmitted to the end user for storage and usage in according to the intended application. The process of FIG. 3 described a method of encoding information using an existing object with the native surface relief pattern. Alternatively, the process can start with creating a relief pattern to use during the encoding process in the form of a model or a prototype, and followed by identifying, modifying or manufacturing a real object to include the created relief pattern with the critical surface texture; or selecting information first, followed by designing a suitable relief pattern to satisfy a criterion, for example, a degree of distortion in the information, and proceeding to creating an object or modifying an existing object to incorporate the relief pattern, finalizing the process by producing an encoded structured illumination pattern. In principle, the object can be a virtual object, that is, created, defined or stored as a computer model. It can be used to encode and decode information in the virtual environments.

Figure 6:
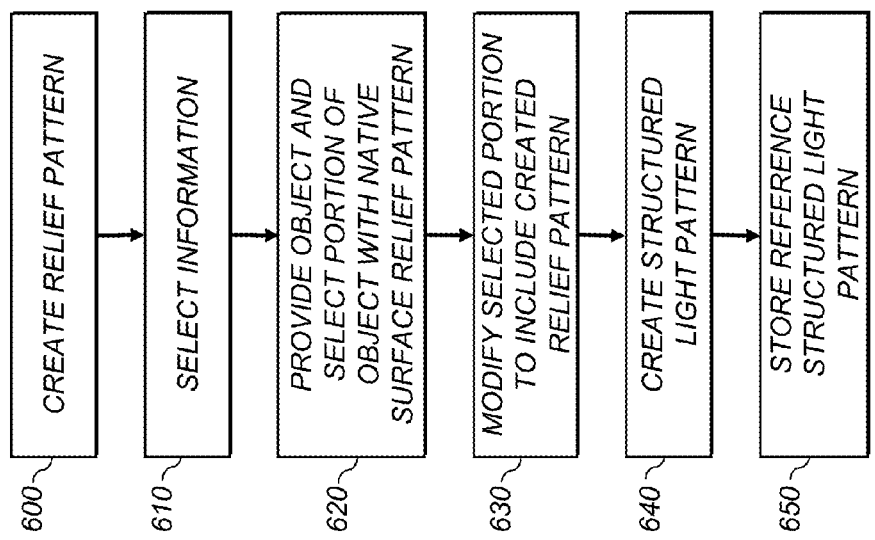
FIG. 6 is an example of creating the structured illumination pattern using inverse projection method.

An example of the process with an alternate sequence of steps is illustrated in FIG. 6 as follows. In step 600 a desired relief pattern is defined in the form of a model or created as a physical prototype as a part of a surface. Next, information is selected and represented in a desirable physical form in step 610. This physical representation can optionally include verification of the suitability of its characteristics or parameters to be subjected to a sufficient distortion by the created relief pattern. Alternatively, it can be chosen by adherence to one or more pre-established rules, for example, by selecting a specific font size or color. In step 620 a target object is provided and a portion of its surface is designated for the usage in the encoding process. This designated portion of the surface is then modified in step 630 to include or match the designed relief pattern of step 600. Subsequently, the encoded structured light pattern is created in step 640, for example, using a similar method to the step 325 of FIG. 3; and stored in the memory in the step 650 of FIG. 6.

Figure 7:
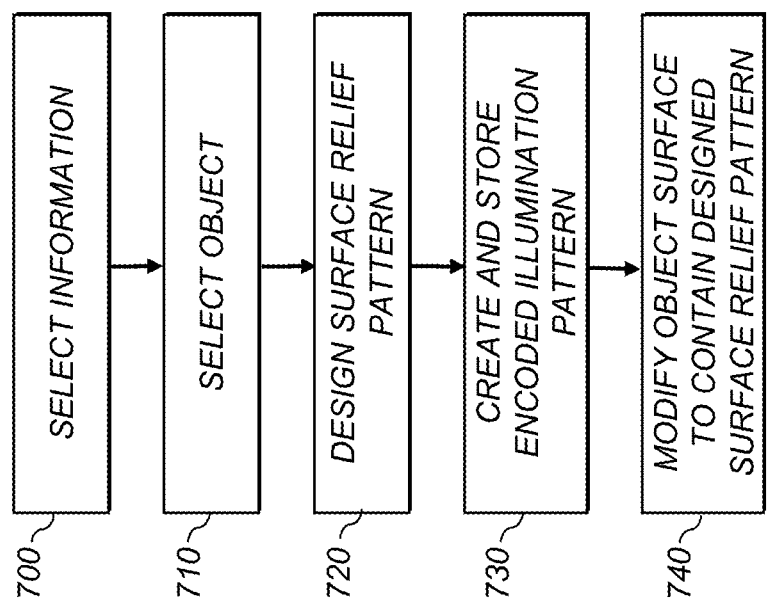
FIG. 7 is an illustration of the reflected pattern used for authentication process.

Another embodiment with the alternate sequence of steps is shown in FIG. 7, where the process starts with selecting information in step 700, similarly to the descriptions provided earlier. Subsequent steps include selecting an object (step 710), designing a surface relief pattern (step 720), creating and storing an encoded illumination pattern using selected information and the designed surface relief texture or pattern (step 730), and modifying the object's surface to contain the designed surface texture (step 740).

Optionally, during the process of encoding information in the structured light patterns illustrated in FIG. 3, FIG. 6 and FIG. 7, additional iterations of the described steps can be further employed to better define, refine and create these three elements: surface relief texture, information and encoded structured light pattern, which mutually serve as a triplet for the encoding and decoding information. Alternate embodiments can incorporate steps to test and verify the encoded light pattern for unrecognizability and robustness against retrieving information without the appropriate key, which is served by the critical surface relief texture.

Figure 8:
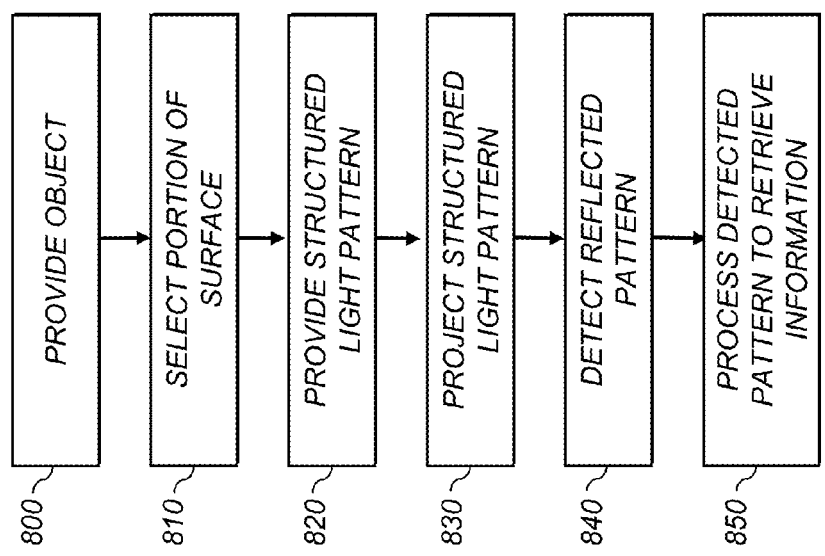
FIG. 8 is a process diagram for authenticating the object using encoded information.

In yet another embodiment, the process of creating an encoded illumination pattern can be modified such, that after the step of selecting information, the selected information is then scrambled or distorted to satisfy a pre-selected criterion, for example, a threshold amount of distortion to enable unrecognizability. Such distortion, can be created, for example, using existing warping algorithms. Creation of such distortion can be described as follows. The information represented in the form of an image is partitioned into local segments and a warping algorithm is separately applied to each of the local image segments to produce different localized distortions for corresponding segments. Local distortions are used to avoid application of the global warping transformation, because globally applied distortion can be indentified using mathematical analysis, reducing thus the robustness of the encoding. An amount of distortion is then evaluated to satisfy a recognizability criterion. If the amount of distortion is below recognizability threshold, or, inversely, above the unrecognizability threshold, the distorted information is then used to generate the encoded structured light pattern using the inverse projection method described previously. The surface relief pattern is defined by the parameters of the local distortion used in the process of generating locally warped image with the information. Finally, the surface relief pattern can be produced as a part of an object or implemented in a computational form as a virtual object or model. Conversely, the distorted information can be treated as an encoded information, and the inverse projection can be used to characterize the critical surface relief pattern, which is needed to compensate for the distortion in the process of retrieving information, FIG. 8 illustrates a method for retrieving information encoded in a structured illumination pattern in accord with the present invention. To retrieve information from its encoded form, an object with the critical surface incorporating the critical surface texture pattern or surface relief pattern, is provided in step 800. There can exist numerous ways of providing or obtaining such object including locating it, sending, manufacturing based on the provided specification, or transmitting via the network or other methods of data transmission the data mathematically describing the object in the form of a model, or representing the object in a virtual form including visualizing the object using computer graphics means.

Next, in step 810 one or more portions containing critical surface texture or surface relief patterns are selected. The selection can be indicated in the specification or description of the object in any suitable form, or, in other embodiments, separately communicated in relation to the object, or the description of the object, or its elements. Alternatively, the marks can be made or identified on the object as fiducials for the purpose of determining the critical surface locations.

Yet, in other embodiments the process of selection of the critical surface texture patterns can consist of repeated trials in the form of a search, where in each step an arbitrary portion of the object's surface is selected or using a rule based search, thus selecting a number of candidate portions. In step 820 the encoded information in the form of the structured light pattern is provided. Similarly to obtaining the object, the encoded information can be transmitted wirelessly or via the wired network, send as a physically printed pattern that can be converted into a digital image to obtain the structured light pattern using for example, scanning technique, handed or located on a computer storage media, or communicated in the form of a data that can be used to reconstructed the structured light pattern including the reconstruction as a computerized model. Then, the encoded structured light pattern is projected onto the one or more selected portions of the surface in step 830.

The projection can be utilized using various digital projection devices or devices capable of emitting illumination in the form of an image reproducing the specifications of the encoded light pattern. Alternatively, the projection can be simulated using computer graphics programs or in purely mathematical form without the visualization part. The projection can also include selecting certain parts of the encoded information that can be simultaneously or in succession projected onto one or more selected surface relief patterns. If the encoded information is represented as a series of frames, segments or as a digital video file, a specific sequence of projecting can be followed which can be pre-established, separately communicated or defined using a rule.

In step 840 the detection of the reflected pattern or patterns that results from the projection takes place. The detection can be done visually or using a capture device. If the projection is utilized virtually, the detection can also be done virtually, thus in the form of the computerized data created using the processor, which can be stored in the computer memory, and, optionally, visualized via displaying or printing.

Finally, in step 850 the detected in step 840 pattern or patterns are processed to retrieve information. In one embodiment, the processing for retrieving information is performed visually. In other embodiments, it can be done automatically, for example, using pattern recognition algorithms. Alternatively, the detected on step 840 pattern or patterns can be tested against an existing database of pattern, such that the detected patterns can be compared with the patterns in the database using various types of analysis techniques, including visual analysis and automatic analysis to identify information. The retrieved information including, the results of an automatic processing can be stored, transmitted for additional usage, including further analysis, or communicated as an end result.

Figure 9:
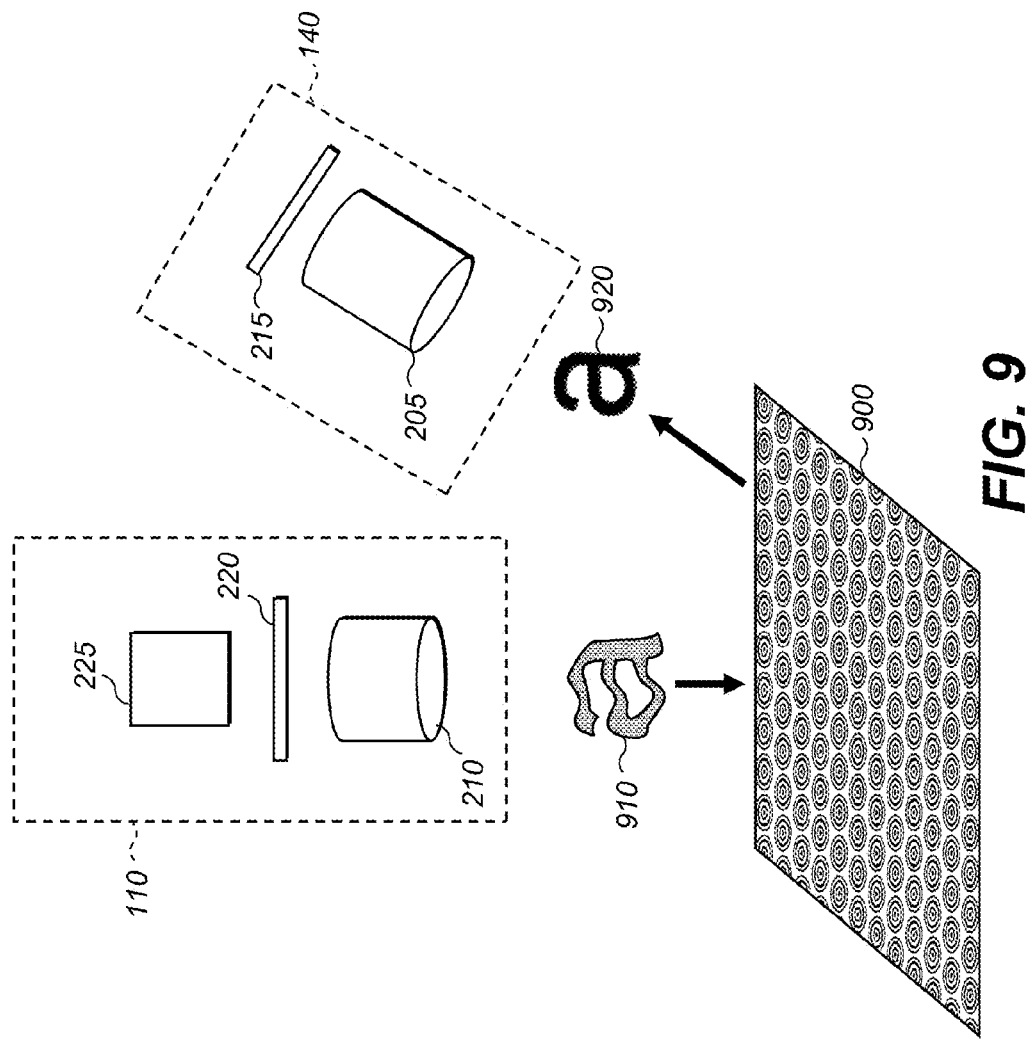
FIG. 9 is an example of a different usage of encoded information illustrated as a process of accessing a database via retrieving encoded information contained in the object surface using structured illumination pattern.

FIG. 9 is a schematic of a system for retrieving information encoded in a structured illumination pattern in accord with the present invention. The digital projector 110 projects a structured illumination pattern 910 with encoded information (in this case, a single character) onto the critical surface texture 900. The structured illumination pattern is shown here as a warped version of a character to represent the fact that it has been mapped through the inverse transformations $X(u,v)$ and $Y(u,v)$ as explained above. After reflection from the critical surface texture 900, the encoded information 920 is captured by the digital camera 140 for output.

In some configurations, the system for retrieving information encoded in a structured illumination pattern can be part of a remote encoded communication system. In one configuration, the sender of the information is in possession of the inverse transformation information, represented above by the inverse transformations $X(u,v)$ and $Y(u,v)$, while the receiver is in possession of the critical surface texture 900. The sender of the information can encode information by mapping a desired output image, the encoded information 920, through the inverse transformations $X(u,v)$ and $Y(u,v)$ to arrive at a structured illumination pattern 910 with encoded information. The structured illumination pattern 910 can be transmitted to the receiver for projection onto the critical surface texture 900, reflection from the critical surface texture 900, and capture of the encoded information 920 by a digital camera. Transmission of the structured illumination pattern 910 from the sender to the receiver can be accomplished in a number of ways. In one configuration, the structured illumination pattern 910 is a digital image that is compressed using standard image compression algorithms, such as the JPEG standard, transmitted to the receiver over the Internet, by CD-ROM or other hard storage media, or by USB-memory devices, and then uncompressed to full size for projection. The structured illumination pattern 910 can also be digitally encrypted using a public/private key encryption method for added security. In other configurations, the structured illumination pattern 910 can be written onto hard copy media, physically delivered to the receiver, and then digitally scanned into a computer for projection onto the critical surface texture 900.

Figure 10:
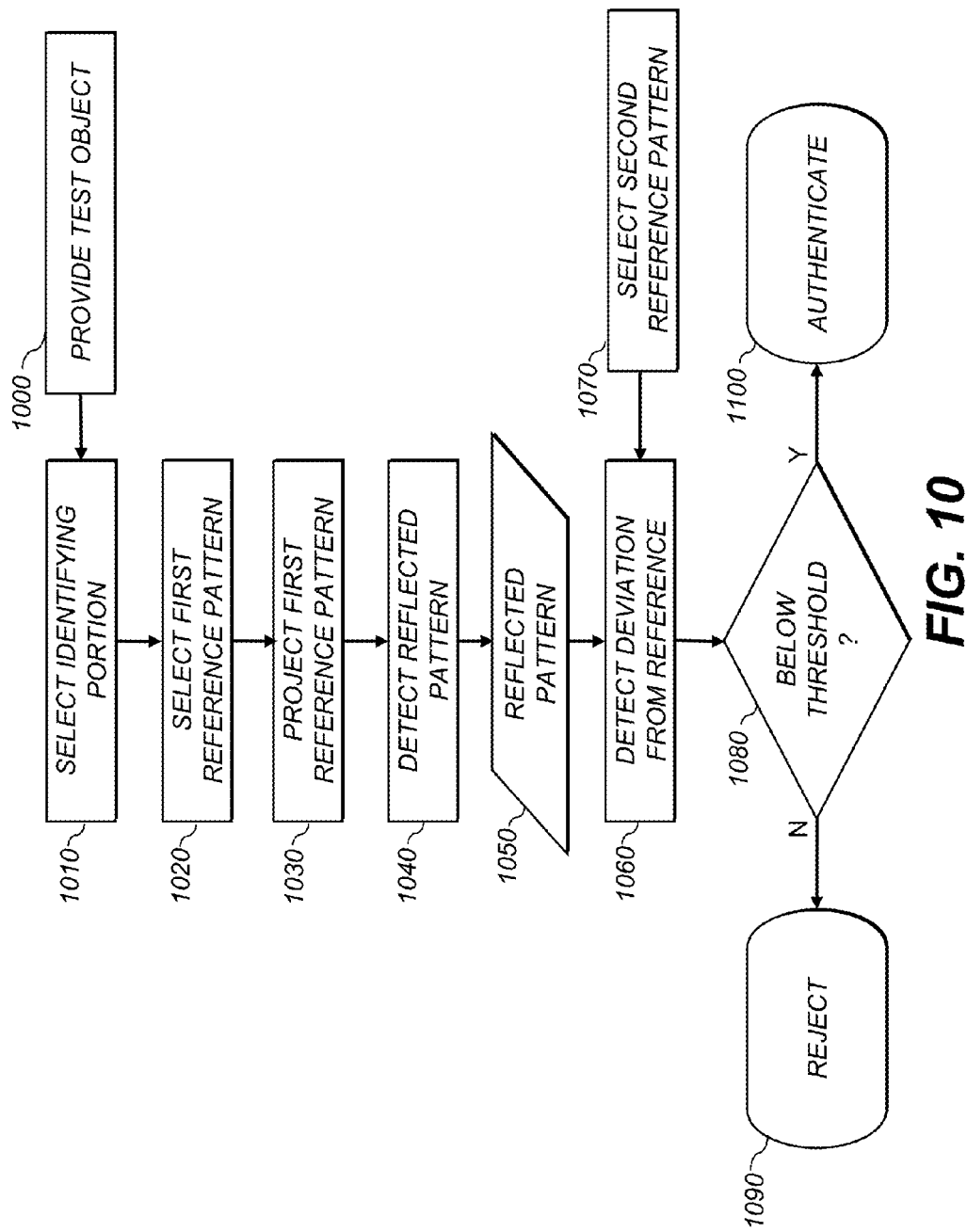
FIG. 10 is a flow diagram of a method for authenticating an object using information encoded in a structured illumination pattern, in accord with the present invention.

The process of encoding and retrieving information using structured illumination can be applied to authenticate an object having a 3D texture or a 3D relief pattern. FIG. 10 is a flow diagram of a method for authenticating an object using information encoded in a structured illumination pattern, in accord with the present invention. The object to be tested is provided in step 1000 and at least one identifying portion is selected in step 1010. The identifying portion can be a critical surface texture or critical surface relief pattern, which can contain unique surface characteristics of the object, differentiating the authentic (reference) object from similar objects. As explained in the description of FIG. 8, the selection of the identifying portion can be included in the specification or description of the object, or in other embodiments, separately communicated in relation to the object, the description of the object, or its elements. In addition, marks can be made or engraved on the object as references or fiducials for the purpose of determining the critical surface locations. In yet other embodiments the selection of the identifying portion with the critical surface texture patterns can consist of repeated trials in the form of a search, in which each step a candidate portion of the object's surface is selected, or, conversely, the search can be a rule based search, and lead to selecting a number of candidate portions. In step 1020, a first reference pattern is selected and then projected onto the test object in step 1030 using a system such as the ones illustrated in FIG. 1 or FIG. 2. This first reference pattern is an encoded structured light pattern, and is applied onto the object to test its authenticity. Such test pattern can be used together with the authentic object having a critical surface texture, as a lock and key pair to retrieve the information and thereby authenticate the object. The test pattern can be retrieved from a database of test patterns, or can be reconstructed from parameters stored in a database, or can be provided independently. The reflection of the first reference pattern from the object 1050 is detected in step 1040 This reflected pattern is then evaluated regarding the encoded information. This information can be contained in a second reference pattern. The second reference pattern, is then selected in step 1070, and any deviations between this pattern and the reflected pattern 1050 are detected in a comparison step 1060. A decision is made in step 1080 based on the deviations detected in step 1060 and a threshold. If the deviations are below the threshold, then the object is authenticated in step 1100. If the deviations are above the threshold, then the object is rejected for authentication in step 1090.

The entire authentication process described in FIG. 10 can be performed automatically, including step 1060, which detects deviations between the reflected pattern and the second reference pattern. Alternatively, all or some of the steps can be performed manually. The evaluation of the reflected pattern 1050 can also be based on visual inspection. Similarly, the comparison in step 1060 with the second reference pattern and detections of any deviations can also be done visually.

While in some embodiments it can be advantageous to have the second reference pattern available at the time and place of authentication, for example, displayed or otherwise represented, such as in the form of a print or a scanned document; in other embodiments the second reference pattern may be stored remotely and the comparison process performed at another location and or delayed in time. In an alternative embodiment, the second reference pattern can be stored in the memory of the person performing authentication, and the comparison in step 1060 consists of determining if the reflected pattern matches memorized second reference pattern. The comparison in step 1060 can be based on matching physical appearance of patterns, with the threshold applied in step 1080 to the differences in physical appearance (visually assessed or processed using relevant physical parameters, such as color, shape, edge information, etc.) to establish or reject the match, and therefore, confirm or reject the object as being authentic. Alternately, the comparison can be performed based on the semantic interpretation of the patterns, although their physical appearance can be different. For example, both patterns can contain text messages or other types of symbols having similar meaning but expressed differently. Therefore, the comparison involves evaluating the similarity of the meaning or semantic interpretations. In another embodiment the mere acknowledgement of semantic or visual interpretability of the reflected pattern 1050 can be used as a criterion of the authenticity (for example, in decision step 1080) stemming from the fact that the encoded information is successfully retrieved if it is interpretable, and therefore the object is deemed authentic in step 1100; or, conversely, the object is rejected as being authentic in step 1090, if the information cannot be interpreted, visually or semantically from the reflected pattern 1050. In such embodiment steps 1060 and 1070 can be omitted.

Figure 11:
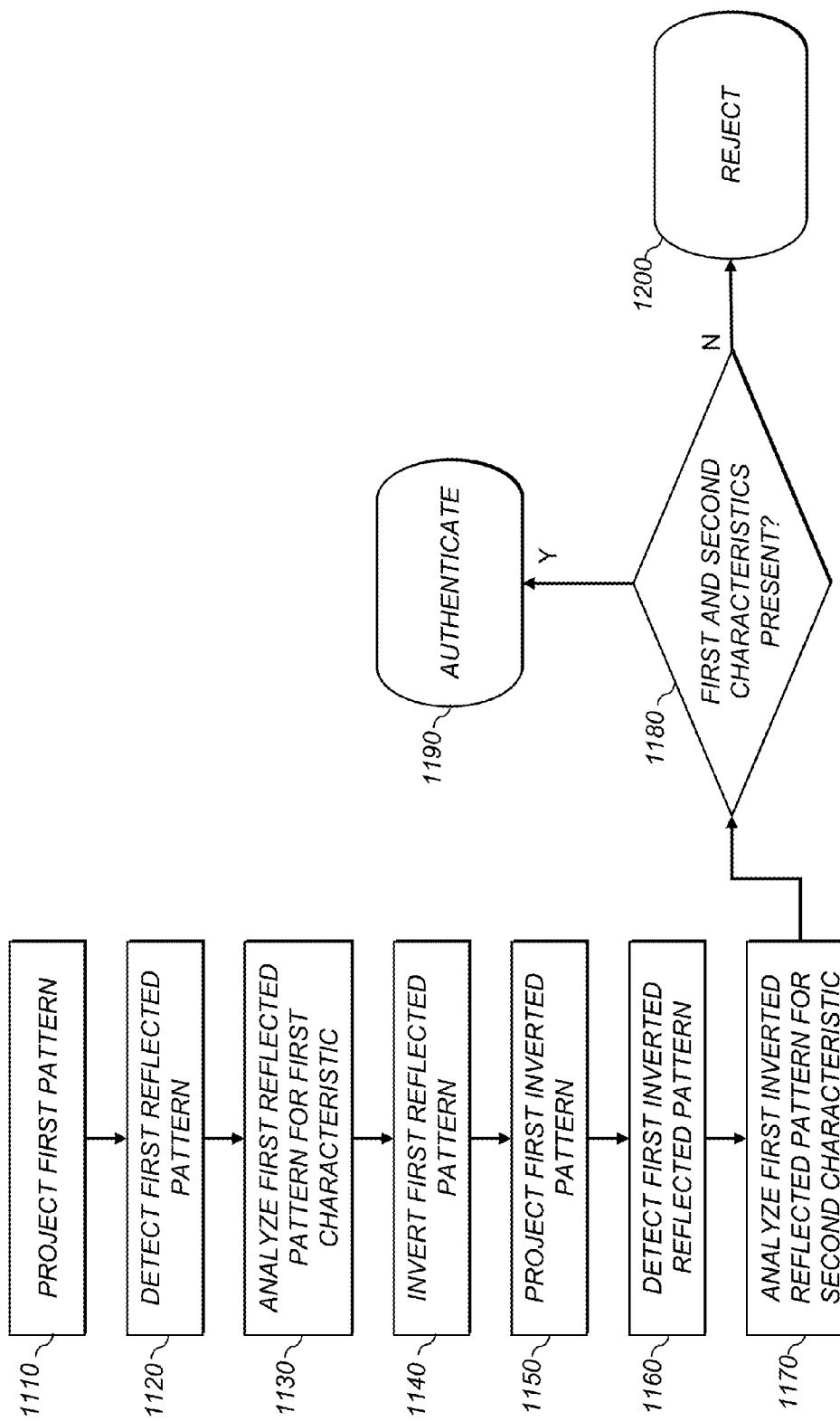
FIG. 11 is a flow diagram of a method for authentication of three-dimensional structures, in accord with the present invention.

FIG. 11 is a flow diagram of a method for authentication of three-dimensional structures, in accord with the present invention. In step 1110, a first pattern of illumination is projected onto the three-dimensional structure using a system such as those illustrated in FIG. 1 or FIG. 2. The patterns of illumination can be retrieved from a database of illumination patterns, or can be reconstructed from parameters stored in a database, or can be provided independently. Next, the reflection of the first illumination pattern from the three-dimensional structure is detected in step 1120. Referring to FIG. 1, detection of the first illumination pattern includes forming an image of the pattern via the digital camera lens 205 onto the image sensor 215. The first reflected pattern is then analyzed for a first characteristic in step 1130.

Such characteristics include well-known first order statistics such as mean, standard deviation, median, or the grey level histogram in one or more color channels. Characteristics can also include, but are not limited to, second or higher order statistics such as the autocorrelation function, power spectrum, or kurtosis in one or more color channels. In some configurations, characteristics can include the results of other linear, nonlinear or morphological image processing operations applied to one or more color channels, information theoretic metrics, or metrics pertaining to possible correlations between color channels. In yet another configuration, analyzing for specific characteristics can include comparing the first reflected pattern to a database of patterns. Such a comparison can include searching for a matching pattern, searching for a pattern that has matching derived statistics, or searching for a pattern that has a mathematical correlation exceeding a threshold.

In the next step 1140, the first reflected pattern is inverted, using the mathematical inversion operations described previously. The inverted pattern is then projected 1150 onto the three-dimensional structure, and the reflection of this pattern, which will be termed the first inverted reflected pattern, is detected 1160. This detected pattern is then analyzed 1170 for a second characteristic. The characteristics include those mentioned above, and also characteristics related to differences between the first and second detected patterns. A decision step 1180 then determines whether the first and second characteristics pertaining to an authentic object are present. If both characteristics are present, then the object is authenticated in step 1190. If either characteristic is not present, then the object is rejected for authentication in step 1200.

This method of authentication relies on examination of a first structured light pattern that is distorted by the surface. This reflected pattern is analyzed to determine if the distortions present are those which are characteristic of the authentic object. As an additional test, the detected pattern is inverted and projected back onto the object. If the object is authentic, this step will result in a new reflected pattern (the first inverted reflected pattern) that should match the original, first structured light pattern. If the object is not authentic, the inverted image contains errors with respect to an authentic inverted image. Projection of an erroneous inverted image onto the object results in further errors that enhance the mismatch between the characteristics of the final detected image and the original first structured light pattern. In another configuration, the first inverted reflected pattern can be directly compared to the original projected structured lighting pattern, rather than comparing derived characteristics or statistics from each pattern.

Figure 12:
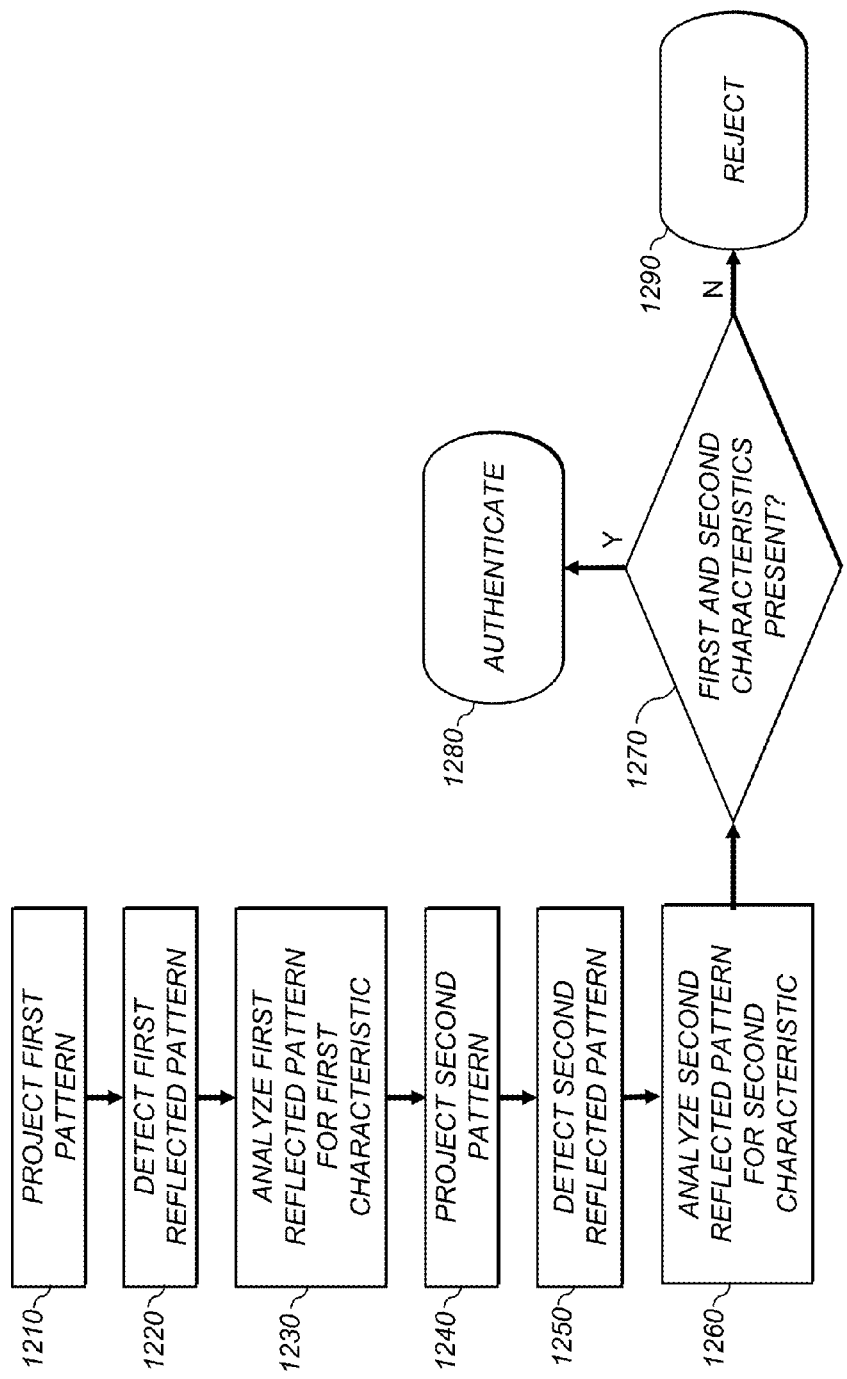
FIG. 12 is a flow diagram of a method for authentication of three-dimensional structures, in accord with the present invention.

FIG. 12 is a flow diagram of a method for authentication of three-dimensional structures, in accord with the present invention. In step 1210, a first pattern of illumination is projected onto the three-dimensional structure using a system such as those illustrated in FIG. 1 or FIG. 2. The patterns of illumination can be retrieved from a database of illumination patterns, or can be reconstructed from parameters stored in a database, or can be provided independently. Next, the reflection of the first illumination pattern from the three-dimensional structure is detected in step 1220. Referring to FIG. 1, detection of the first illumination pattern includes forming an image of the pattern via the digital camera lens 205 onto the image sensor 215. The first reflected pattern is then analyzed for a first characteristic in step 1230. Such characteristics include those described above in connection with FIG. 11.

In the next step 1240, a second pattern of illumination is projected onto the three-dimensional structure, similar to the projection of the first pattern of illumination. Next, the reflection of the second illumination pattern from the three-dimensional structure is detected in step 1250. The second reflected pattern is then analyzed for a second characteristic in step 1260, similar to the analysis of the first reflected pattern. A decision step 1270 then determines whether first and second characteristics pertaining to an authentic object are present. If both characteristics are present, then the object is authenticated in step 1280. If either characteristic is not present, then the object is rejected for authentication in step 1290.

Figure 13:
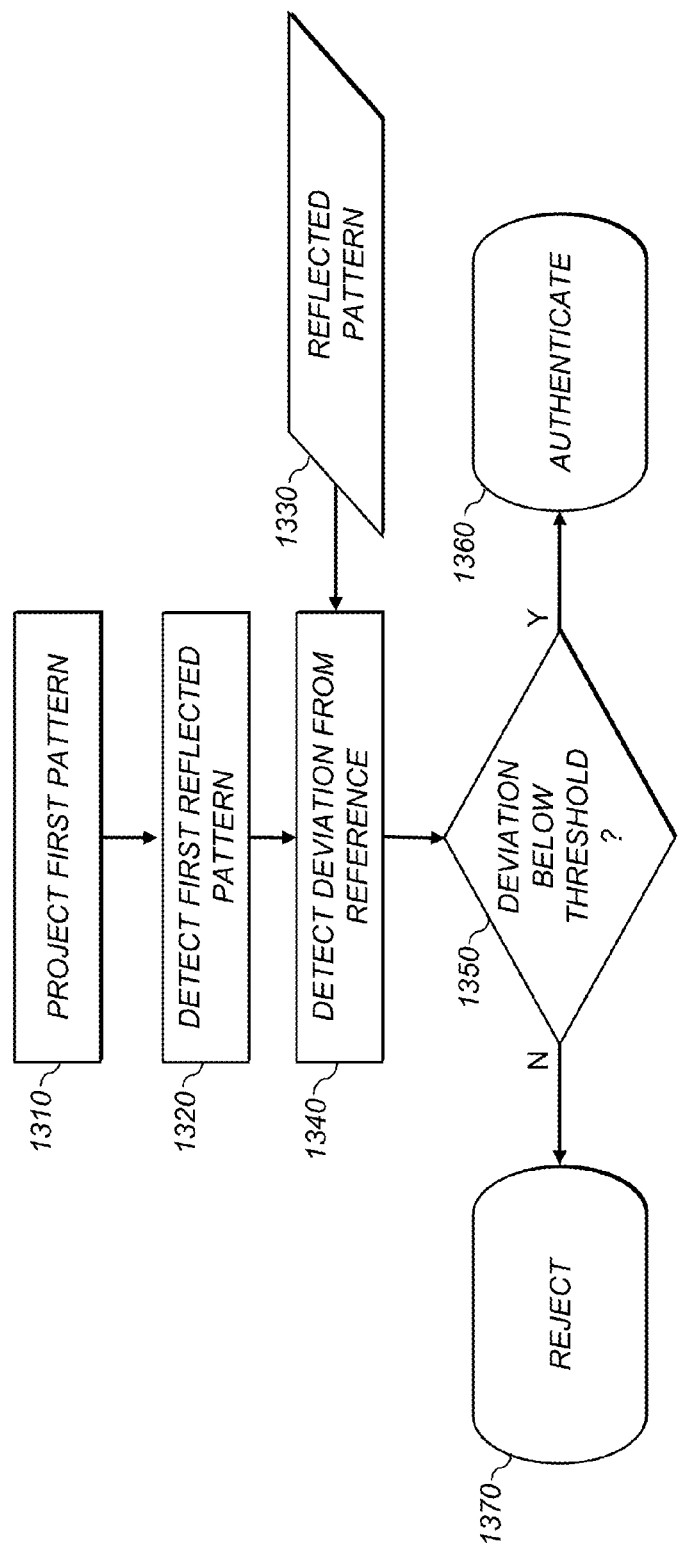
FIG. 13 is a flow diagram of an alternative method for authentication of three-dimensional structures, in accord with the present invention.

FIG. 13 is a flow diagram of an alternative method for authentication of three-dimensional structures, in accord with the present invention. In step 1310, a first pattern of illumination is projected onto the three-dimensional structure using a system such as those illustrated in FIG. 1 or FIG. 2. Once again, single or multiple patterns of illumination can be retrieved from a database, or can be reconstructed from parameters stored in a database, or can be provided independently. Next, the reflection of the first illumination pattern from the three-dimensional structure is detected in step 1320. Referring to FIG. 1, detection of the first illumination pattern includes forming an image of the pattern via the digital camera lens 205 onto the image sensor 215. The first reflected pattern is then analyzed for a first characteristic in step 1230. Such characteristics include those described above in connection with FIG. 11

The detected pattern is then analyzed 1340 to detect deviations from a reference pattern 1330. A decision step 1350 then determines whether the deviation is below a threshold. If the deviation is below threshold, then the object is authenticated in step 1360. If the deviation is not below threshold, then the object is rejected for authentication in step 1370.

It will be appreciated by those skilled in the art that these methods can be extended and elaborated within the scope of the invention. For example, the methods of FIGS. 10-13 can be extended to compare a reference object with a test object as follows: project a first pattern of illumination onto a reference three-dimensional structure, detecting and recording the reflection of this pattern from the reference structure; invert the image of the reflected pattern; create a second pattern of illumination from the inverted image; project this second pattern onto a structure to be authenticated; compare the reflected pattern of light from the object under test to the first pattern of illumination; and authenticate the structure if the measured deviations are within a threshold. In one configuration, the party performing the authentication is only in possession of the parameters of the system for illuminating the reference and test objects, the inversion algorithm, which can be in the form of executable code, and the first pattern of illumination. The sender of the information can supply the reference object and the code for the inversion algorithm, as well as the first pattern of illumination Also within the scope of the invention is the authentication of three-dimensional structures based on their spectral or color characteristics. In particular, a method for authentication of three-dimensional structures can include capturing a multicolor image of a reference structure, where a multicolor image is understood to be a capture using more than one spectral sensitivity or spectral bandpass. Image captures of multiple spectral bandpass can be generated through the use of multiple color filters or other wavelength-dependent components inserted into the optical path of a capture device, or through the use of multiple capture devices.

Following the capture of the multicolor image, the method continues with the creation of at least one pattern of illumination based on at least one color of the reference structure. Basing the pattern of illumination on at least one color of the reference structure includes selecting at least one spectral band wherein the reference structure has significant spectral reflectance values, or selecting at least one region or critical surface texture that exhibits this same property. The critical surface texture selected may or may not include additional spectral bands of significant spectral reflectance.

In one configuration, the pattern of illumination created can include inversion of a pattern that illuminates the reference object during the capture of the multicolor image. Next, the created illumination pattern is projected on the three-dimensional structure to be authenticated, and the reflected pattern is analyzed for a pre-determined characteristic. As described previously with reference to other configurations of the invention, the pre-determined characteristic can be provided along with or separately from the structure to be authenticated, or can be retrieved from a database. The structure is then authenticated if the pre-determined characteristic is present. In one configuration, the pre-determined characteristic is a color difference at, above or below a particular threshold value. In another configuration, the pre-determined characteristic is both a color characteristic and a geometric portion or property found in the reference structure.

FIG. 14 is a flow diagram of another embodiment of the method for authenticating an object using information encoded in a structured illumination pattern, in accord with the present invention. The object to be tested is provided in step 1410 and an identifying portion of the test object having a surface with the surface texture or surface relief is selected in step 1420. The identifying portion of the test object surface as mentioned above can contain critical surface texture or critical surface relief pattern, which can contain unique surface characteristics of the reference authentic object. In other words, the identifying portion of the test object can be expected to contain critical surface texture, relief pattern or critical surface characteristics, differentiating the authentic and/or reference object from similar objects, if the test object is authentic. In step 1430, a pattern of illumination is obtained. The pattern of illumination can be retrieved from a database of test patterns, or can be reconstructed from parameters stored in a database, from a scanned document or a printed image, or can be provided independently. This pattern is the encoded structured illumination pattern, or the reference pattern of illumination, specifically designed or adapted to the identifying portion of the surface or surface relief of the reference object. The method for designing, creating or adapting the encoded illumination pattern to the identifying portion of the surface with critical surface texture or surface relief pattern has been illustrated earlier in FIG. 3, FIG. 6 or FIG. 7. The encoded structured illumination pattern is then projected onto the identifying portion of the test object surface in step 1440 using a system such as the ones illustrated in FIG. 1 or FIG. 2. The reflection of the projected pattern or reflected pattern from the object 1460 is detected in step 1450. The detection can be done using an appropriate image capture device, optical sensors, including capable of capturing spectral information indicative of material properties and geometric properties, or can be done visually, in the form of observing the pattern. This reflected pattern is processed in step 1470. The processing can involve analyzing the pattern using visual assessment, automatic assessment, applying one or more image processing, feature extraction, computer vision, object, character recognition, spectral or semantic analysis algorithms or other appropriate manual or automatic processing techniques aiming at retrieving, decoding or deciphering information that can be contained in the reflected pattern, including linking it to the codes, ciphers, tables or databases. As it was described earlier, the processing can also include registering and analyzing elements of physical appearance, and physical parameters or characteristics influencing such physical appearance, visually or automatically extracted, or registering and analyzing semantic meaning or semantic or visual interpretability of the reflected pattern. Next, in step 1480 the processed reflected pattern is evaluated or tested to determine if it contains encoded information. The determination can include comparing the processed and analyzed pattern and the extracted/retrieved information with the expected pattern and or expected information. The expected encoded information can be obtained from the database, via communication or through other means described previously and can be expressed in the form of a pattern, a text, message, geometrical figures, symbols, codes, numbers or mathematical or computer models, formulas etc. With respect to the embodiment of FIG. 14, such pattern with the expected information can be called a reference information pattern. In the context of FIG. 10 such pattern is called the second reference pattern.

The comparison can utilize applying various measures, for example, interpretability, legibility, presence of specific colors, shapes, and codes, specific meaning, number of separate elements and other appropriate criteria. The comparison can also be based on determining the deviations between the processed pattern and expected pattern, or between extracted information from the reflected pattern as a result of processing and expected information, expressing the deviations in the form of a measure. A decision is made in step 1490 based on the evaluation and a criterion that is used to determine if the processed reflected pattern contains encoded information, for example, a threshold with respect to detected deviations between the processed reflected pattern and the pattern containing expected information. If the utilized criterion is satisfied the object is authenticated in step 1491. Conversely, if the criterion is not satisfied, then the object is rejected for authentication in step 1492.

The invention has been described in detail with particular reference to certain preferred embodiments thereof, but it will be understood that variations and modifications can be effected within the scope of the invention. The steps of the invention may be performed in an order different from that specified in the claims and still fall within the scope of the invention.

PARTS LIST 110 projector
115 object
120 illumination pattern
120A illumination pattern
120B illumination pattern
130 relief pattern (textured surface)
135 selected portion
140 camera
140A camera
140B camera
205 capture lens
205A capture lens
205B capture lens
210 projection lens
215 image sensor
215A image sensor
215B image sensor
220 light modulator
225 illumination system
226 baseline
230 processor
245 interface system
250 processor-accessible memory system
310 surface relief of object characterized
312 select information
315 projection direction
320 select portion of object with relief pattern
325 create encoded illumination path
335 capture direction
400 substrate
405 relief element
410 relief element
415 relief element
420 binary image representation
425 white pixels
430 black pixels
500 surface texture
505 row
510 row
515 row
520 row
525 row 600 create relief pattern
610 select information
620 object and select portion provided with native surface relief pattern
630 modify selected portion
640 create structured light pattern
650 store reference structured light pattern
700 select information
710 select object
720 design surface relief pattern
730 create and store encoded illumination pattern
740 modify object surface
800 provide object
810 select portion of surface
820 provide structured light pattern
830 project structured light pattern
840 detect reflected pattern
850 process detected pattern
900 surface texture
910 illumination pattern
920 encoded information
1000 provide test object
1010 select identifying portion
1020 select first reference pattern
1030 project first reference pattern
1040 detect reflected pattern
1050 reflected pattern
1060 detect deviation from reference
1070 select second reference
1080 below threshold pattern
1090 reject
1100 authenticate
1110 project first pattern
1120 detect first reflected pattern
1130 analyze first reflected pattern for first characteristic
1140 invert first reflected pattern
1150 project first inverted pattern
1160 detect first inverted reflected pattern
1170 analyze first inverted reflected pattern for second characteristic
1180 first and second characteristics present
1190 authenticate
1200 reject
1210 project first pattern
1220 detect first reflected pattern
1230 analyze first reflected pattern for first characteristic
1240 project second pattern
1250 detect second reflected pattern
1260 analyze second reflected pattern for second characteristic
1270 first and second characteristics present
1280 authenticate
1290 reject
1310 project first pattern
1320 detect first reflected pattern
1330 reflected pattern
1340 detect deviation from reference
1350 deviation below threshold
1360 authenticate
1370 reject
1410 provide test object
1420 select identifying portion
1430 obtain encoded illumination pattern
1440 project illumination pattern
1450 detect reflected pattern
1460 reflected pattern
1470 process reflected pattern
1480 evaluate reflected pattern
1490 contain information
1491 authenticate
1492 reject

The invention claimed is:

1. A method for retrieving information encoded in a structured illumination pattern, comprising:
selecting an encoded structured illumination pattern having a variable intensity;
providing an object with a surface having a three-dimensional (3D) relief pattern;
selecting at least one portion but not all of the object's surface including the 3D surface relief pattern;
projecting the selected structured illumination pattern onto the selected portion of the surface;
using a digital camera to capture an image of the reflected structured light pattern from the selected portion of the surface;
storing the image in a memory; and
processing the image of the detected reflected structured light pattern using a processor responsive to the detected reflected structured light pattern and the selected structured light pattern to retrieve the encoded information, wherein the encoded information is based on the geometrical and material properties of the 3D surface relief pattern and is distinct from the object, surface, or relief pattern.

2. The method of claim 1 wherein processing the image of the detected structured light patterns includes comparing the patterns to a database of patterns.

3. The method of claim 1 wherein at least one of the object, information and structured illumination pattern is a virtual object.

4. The method of claim 1 wherein the object is a printed document.

5. The method of claim 1 wherein the structured illumination pattern is monochromatic.

6. The method of claim 1 wherein the structured illumination pattern is polychromatic.

7. The method of claim 1 wherein the structured illumination pattern stimulates fluorescence or phosphorescence from the object's surface.

8. The method of claim 1 wherein the structured illumination pattern is a series of patterns.

9. The method of claim 1 wherein the stored structured illumination patterns comprise a video sequence.

10. A method for encoding information in a structured light pattern, comprising:
a) providing a three-dimensional (3D) object;
b) creating a 3D surface relief pattern;
c) modifying the object surface to contain the created 3D surface relief pattern;
d) selecting information to be encoded based on the geometrical and material properties of the 3D surface relief pattern, wherein the information is distinct from the object, surface or relief pattern;
e) selecting at least one portion but not all of the surface relief pattern, based on the amount of distortion introduced by the portion of the 3D surface relief pattern to the information being encoded;
f) creating at least one structured illumination pattern using a processor responsive to the selected portion of the 3D surface relief pattern and the selected information, wherein the structured illumination pattern illuminates the selected portion with a variable intensity; and
g) storing the structured illumination pattern for subsequent decoding.

11. The method of claim 10, further including transmitting the structured light pattern.

12. The method of claim 10, wherein the structured illumination pattern is used for authentication.

13. The method of claim 1, wherein the selected portion differentiates the object from similar objects and the selected illumination pattern is selected responsive to the differentiated portion, and further including:
   authenticating the test object based on the retrieved encoded information.

14. The method of claim 13 wherein the authentication step is based on semantic interpretation.

15. The method of claim 13 wherein the authentication step is based on physical appearance.

16. The method of claim 1, further including:
   analyzing the stored image for a first pre-determined characteristic;
   computing a mathematical inverse transformation of the stored image;
   projecting the mathematically inverted image onto the three-dimensional object;
   using a digital camera to capture a second image of the reflected mathematically inverted image;
   storing the second image in a memory;
   analyzing the second image for a second pre-determined characteristic; and
   authenticating the three-dimensional structure if the first predetermined characteristic and the second pre-determined characteristic are present.

17. The method of claim 16 wherein analyzing the second image comprises comparing the second image to the projected pattern.

18. The method of claim 16 wherein analyzing the second image comprises comparing the second image to a database of patterns.

19. The method of claim 1, further including:
   analyzing the stored image to obtain a first pre-determined characteristic;
   selecting a second encoded structured illumination pattern having a variable intensity;
   projecting the selected second structured illumination pattern onto the selected portion of the surface;
   using a digital camera to capture a second image of the reflected second structured illumination pattern;
   storing the second image in a memory;
   analyzing the second image to obtain a second pre-determined characteristic; and
   authenticating the three-dimensional structure if the first and second pre-determined characteristics are present.

20. The method of claim 19 wherein the first pattern of illumination is monochromatic.

21. The method of claim 19 wherein the first pattern of illumination is polychromatic.

22. The method of claim 19 wherein the first pattern of illumination is monochromatic and the second pattern of illumination is polychromatic.

23. The method of claim 13, further including:
   analyzing the image to detect a deviation from a reference pattern; and
   authenticating the three-dimensional structure if the deviation is less than a threshold.

24. The method of claim 13, further including:
   computing a mathematical inverse transformation of the stored image;
   creating a second pattern of illumination from the mathematical inverse transformation of the stored image;
   projecting the second pattern of illumination on a structure to be authenticated;
   using a digital camera to capture a second image of the second reflected pattern of illumination;
   storing the second image in a memory;
   comparing the second stored image to the first stored image to determine a deviation; and
   authenticating the structure if the deviation is less than a threshold.

25. A method for retrieving information encoded in a structured illumination pattern, comprising:
   providing a reference 3D structure;
   using a digital camera to capture a multicolor image of the reference structure;
   storing the multicolor image in a memory;
   creating at least one pattern of illumination based on at least one color in the image of the reference structure;
   providing an object with a surface having a three-dimensional (3D) relief pattern;
   selecting at least one portion but not all of the object's surface including the 3D surface relief pattern;
   projecting the created structured illumination pattern onto the selected portion of the surface;
   using a digital camera to capture a second image of the reflected structured light pattern from the selected portion of the surface;
   storing the second image in a memory;
   analyzing the second image for a pre-determined characteristic; and
   authenticating the object structure if the predetermined characteristic is present.

26. The method of claim 25 wherein the predetermined characteristic is a color difference.

27. The method of claim 25 wherein the predetermined characteristic is a geometric portion and color of the reference structure.

* * * * *